(12) United States Patent
Zhang et al.

(10) Patent No.: US 11,763,098 B2
(45) Date of Patent: Sep. 19, 2023

(54) SYSTEM AND METHOD FOR LANGUAGE TRANSLATION

(71) Applicant: 7299362 Canada Inc. (o/a Alexa Translations), North York (CA)

(72) Inventors: Renxian Zhang, Markham (CA); Jinnan Lu, Markham (CA); Zhanxuan Ding, Toronto (CA); Jie Ma, North York (CA); Syed Salman Ali, Scarborough (CA); Jason Cox, Pueblo, CO (US); Xun Li, Shanghai (CN)

(73) Assignee: 7299362 Canada Inc., Toronto (CA)

( * ) Notice: Subject to any disclaimer, the term of this patent is extended or adjusted under 35 U.S.C. 154(b) by 395 days.

(21) Appl. No.: 16/939,692

(22) Filed: Jul. 27, 2020

(65) Prior Publication Data

US 2021/0042475 A1    Feb. 11, 2021

Related U.S. Application Data

(60) Provisional application No. 62/883,727, filed on Aug. 7, 2019.

(51) Int. Cl.
*G06F 40/47* (2020.01)
*G06F 40/211* (2020.01)
(Continued)

(52) U.S. Cl.
CPC ............ *G06F 40/47* (2020.01); *G06F 40/211* (2020.01); *G06F 40/42* (2020.01); *G06F 40/44* (2020.01);
(Continued)

(58) Field of Classification Search
CPC ........ G06F 40/47; G06F 40/211; G06F 40/42; G06F 40/44; G06F 40/51; G06F 40/55;
(Continued)

(56) References Cited

U.S. PATENT DOCUMENTS 8,805,672 B2 *   8/2014   Caskey ............... G06F 16/9574
                                                                704/7
9,530,416 B2 *   12/2016  Stern ....................... G10L 15/30
(Continued)

FOREIGN PATENT DOCUMENTS

CN         108460028 A      8/2018

OTHER PUBLICATIONS

Document relating to Application No. GB2012332.9, dated Dec. 29, 2020 (Combined Search and Examination Report), 7 pages.

*Primary Examiner* — Edwin S Leland, III
(74) *Attorney, Agent, or Firm* — BERESKIN & PARR LLP/S.E.N.C.R.L., s.r.l.

(57) ABSTRACT

Provided are computer implemented systems and methods for providing improved language translation, including translation of input text to an output translated text element. This may include providing for rule-based language translation. This may further include a plurality of machine translation models adapted to different translation domains. A machine translation selector is described that selects an in-domain machine translator from the plurality of machine translation models based on an input text element. The selected in-domain machine translator may generate a first translated text element from the input text element. A post-editor module may generate a second translated text element by predicting a post-edit to the first translated text element. The first translated text element and the second translated text element are evaluated by a quality evaluation model that determines a first metric associated with the first translated text element and a second metric associated with the second text element.

34 Claims, 18 Drawing Sheets

(51) Int. Cl.

| | |
|---|---|
| *G06F 40/42* | (2020.01) |
| *G06F 40/44* | (2020.01) |
| *G06F 40/51* | (2020.01) |
| *G06F 40/55* | (2020.01) |
| *G06N 3/04* | (2023.01) |
| *G06N 3/08* | (2023.01) |
| *G06N 5/02* | (2023.01) |
| *G06N 7/00* | (2023.01) |
| *G06N 20/00* | (2019.01) |
| *G06N 3/082* | (2023.01) |
| *G06N 3/086* | (2023.01) |
| *G06N 5/025* | (2023.01) |
| *G06N 3/044* | (2023.01) |
| *G06N 7/01* | (2023.01) |
| *G06F 40/20* | (2020.01) |

(52) U.S. Cl.
CPC .............. *G06F 40/51* (2020.01); *G06F 40/55* (2020.01); *G06N 3/04* (2013.01); *G06N 3/044* (2023.01); *G06N 3/082* (2013.01); *G06N 3/086* (2013.01); *G06N 5/025* (2013.01); *G06N 7/01* (2023.01); *G06N 20/00* (2019.01); *G06F 40/20* (2020.01)

(58) Field of Classification Search
CPC ........ G06F 40/20; G06N 3/04; G06N 3/0445; G06N 3/082; G06N 3/086; G06N 5/025; G06N 7/005; G06N 20/00

USPC .......................................................... 704/2
See application file for complete search history.

(56) References Cited

U.S. PATENT DOCUMENTS

| | | | | |
|---|---|---|---|---|
| 9,836,457 | B2* | 12/2017 | Fujiwara | G06F 40/51 |
| 9,910,847 | B2* | 3/2018 | Bittmann | G06F 40/30 |
| 10,268,685 | B2* | 4/2019 | Zeng | G06F 40/55 |
| 10,437,933 | B1* | 10/2019 | Clifton | G06F 40/216 |
| 2008/0195372 | A1* | 8/2008 | Chin | G06F 40/58 |
| | | | | 704/2 |
| 2009/0083023 | A1* | 3/2009 | Foster | G06F 40/45 |
| | | | | 704/3 |
| 2012/0173224 | A1* | 7/2012 | Anisimovich | G06F 40/284 |
| | | | | 704/9 |
| 2015/0347397 | A1* | 12/2015 | Venkatapathy | G06F 40/44 |
| | | | | 704/2 |
| 2017/0060854 | A1* | 3/2017 | Zeng | G06F 40/30 |
| 2017/0091177 | A1* | 3/2017 | Sonoo | G10L 13/08 |
| 2017/0161264 | A1* | 6/2017 | Zhao | G06F 40/58 |
| 2018/0189259 | A1* | 7/2018 | Merl | G06F 40/263 |
| 2018/0232451 | A1* | 8/2018 | Lev-Tov | G06F 16/248 |
| 2019/0087417 | A1* | 3/2019 | Wang | G06F 40/53 |
| 2020/0026766 | A1* | 1/2020 | Ji | G06V 30/153 |
| 2020/0098352 | A1* | 3/2020 | Feinstein | G10L 15/063 |
| 2021/0042475 | A1* | 2/2021 | Zhang | G06N 20/00 |
| 2021/0334478 | A1* | 10/2021 | Greenberg | G06F 40/51 |
| 2023/0152598 | A1* | 5/2023 | Brebner | G02B 27/0977 |
| | | | | 359/627 |

\* cited by examiner

← 820

| Input Source Text Element | Input Target Text Element | Input Text Metadata A | Output Target Text Element | Output Text Metadata A |
|---|---|---|---|---|
| The quick brown fox | La renard brun rapide | 1 | Le renard brun rapide | 10 |
| Jumped over the lazy dog | Sauté sur le chien paresseux | 2 | Sauté par-dessus le chien paresseux | 11 |
| Shareholder Agreement | Convention d'actionnaire | 3 | Accord des actionnaires | 12 |
| This agreement | Ca accord | 4 | Cet accord | 13 |
| Effective date | Date effective | 5 | Date effective | 14 |
| The parties agree as follows | Les parties conviennent qui suit | 6 | Les parties conviennent de ce qui suit | 15 |
| Representations and warranties | Déclarations et garanties | 7 | Représentations et garanties | 16 |
| Ultra soft cotton | Coton doux ultra | 8 | Coton ultra doux | 17 |
| Reinforced heel and toe areas | Talon et orteils renforcés | 9 | talon renforcés et les orteils | 18 |

| Input Source Text Element | Translated Text Element | Translated Text Metadata A | Evaluation Score |
|---|---|---|---|
| The quick brown fox | La renard brun rapide | 1 | 50 |
| The quick brown fox | Le renard brun rapide | 2 | 80 |
| Jumped over the lazy dog | Sauté sur le chien paresseux | 3 | 40 |
| Jumped over the lazy dog | Sauté par-dessus le chien paresseux | 4 | 90 |
| Shareholder Agreement | Convention d'actionnaire | 5 | 20 |
| Shareholder Agreement | Accord des actionnaires | 6 | 85 |
| This agreement | Ca accord | 7 | 15 |
| This agreement | Cet accord | 8 | 70 |
| Effective date | Date effective | 9 | 25 |
| Effective date | Date effective | 10 | 100 |
| The parties agree as follows | Les parties conviennent qui suit | 11 | 55 |
| The parties agree as follows | Les parties conviennent de ce qui suit | 12 | 99 |
| Representations and warranties | Déclarations et garanties | 13 | 55 |
| Representations and warranties | Représentations et garanties | 14 | 65 |
| Ultra soft cotton | Coton doux ultra | 15 | 30 |
| Ultra soft cotton | Coton ultra doux | 16 | 95 |
| Reinforced heel and toe areas | Talon et orteils renforcés | 17 | 10 |
| Reinforced heel and toe areas | talon renforcés et les orteils | 18 | 55 |

FIG. 9B

SYSTEM AND METHOD FOR LANGUAGE TRANSLATION

CROSS-REFERENCE TO RELATED APPLICATIONS

This application claims the benefit of U.S. Provisional Application No. 62/883,727 filed on Aug. 7, 2020, which is incorporated by reference herein in its entirety.

FIELD

The described embodiments relate to language translation.

BACKGROUND

Communication between human beings is made possible by a variety of different language systems that allow individuals to exchange ideas. Languages allow humans to undertake linguistic behavior, including learning languages and understanding utterances. Languages further allow for a formal system of signs that are governed by grammatical and semantic rules to communicate meaning.

The development of language, and an individual's understanding of a given language, are often culturally linked. While individuals are often bi-lingual, tri-lingual, or multi-lingual, it is often challenging and time consuming for ideas to be communicated between individuals in different languages.

In the past, language translation was a problem solved by human translators fluent in a source and a target language. Such human driven solutions are expensive and time consuming, and subject to limitations in accuracy based on the proficiency of the translator. Current systems and methods for machine language translation, such as Google® Translate® may provide for the machine translation of written text between two different languages, however their accuracy in translation is limited. Where correctness is required in translations, machine translations are still post-edited by human editors in an expensive and time consuming process.

SUMMARY

In order to solve aspects of the problems associated with language translation, there is provided a system and method of language translation that provides for improved accuracy in translation. This may include providing for rule-based language translation. This may further include a plurality of machine translation models adapted to different translation domains. A machine translation selector is described that selects an in-domain machine translator from the plurality of machine translation models based on an input text element. The selected in-domain machine translator may generate a first translated text element from the input text element. A post-editor module may generate a second translated text element by predicting a post-edit to the first translated text element. The first translated text element and the second translated text element are evaluated by a quality evaluation model that determines a first metric associated with the first translated text element and a second metric associated with the second text element.

In a first aspect, some embodiments provide a computer implemented method for language translation, the method comprising: providing a plurality of machine translation models; receiving, at a machine selector module, an input text element in a first language; selecting, at the machine selector module, a selected machine translator model in the plurality of the machine translation models based on a machine selector model of the machine selector module; translating, at the selected machine translator model, a first translated text element, the first translated text element resulting from a translation of the input text element in the first language into a second language based on the selected machine translation model; determining, at a post-editor module, a second translated text element based on the first translated text element, the second translated text element generated from a predicted post-edit of the first translated text element based on the post-editor module; evaluating, at a quality evaluation module, a first quality metric corresponding to the first translated text element and a second quality metric corresponding to the second translated text element, the first quality metric and the second quality metric determined based on the quality evaluation module; and determining, at the quality evaluation module, a output translated text element based on the first quality metric and the second quality metric.

In at least one embodiment, the machine selector module may comprise a machine selector model, the machine selector model for selecting the selected machine translator model by classifying the input text element as in-domain for the selected machine translator model.

In at least one embodiment, the post-editor module may comprise a post-editing model, the post-editing model for generating the second translated text element by predicting the predicted post-edit.

In at least one embodiment, the quality evaluation module may comprise a quality evaluation model, the quality evaluation model for determining the first quality metric and the second quality metric.

In at least one embodiment, each of the plurality of machine translation models may comprise at least one of a statistical language translation model, a neural network language translation model, and a third party language translation model.

In at least one embodiment, if the input text element is in-domain of the third party language translation model, the first translated text element may be used as the output translated text element.

In at least one embodiment, the method may further comprise: determining, at a rule-based translator comprising a plurality of translation rules, if the input text element matches a candidate translation rule in the plurality of translation rules, and if so: determining the output translated text element based on the input text element and the candidate translation rule.

In at least one embodiment, each of the plurality of translation rules may comprise a regular expression.

In at least one embodiment, the method may further comprise: determining, at a cache in a memory, the presence of the input text element in the cache using the input text element as a cache key, and if the input text element is present in the cache: determining the output translated text element based on a cache value associated with the cache key; else: storing the output translated text element in the cache using the input text element as the cache key.

In at least one embodiment, the method may further comprise: outputting the output translated text element.

In at least one embodiment, the method may further comprise: if the first and second quality metrics are less than a threshold: determining the output translated text element based on the third-party language translation model.

In at least one embodiment, the first quality metric, the first text element, the second quality metric, and the second text element may be provided to the post-editor.

In a second aspect, some embodiments provide a system for language translation, the system comprising: a memory, the memory comprising: a plurality of the machine translation models; a machine selector module; a post-editing module; a quality evaluation module; a processor in communication with the memory, the processor configured to: receive an input text element in a first language; select, using the machine selector module, a selected machine translator model in the plurality of machine translation models; translate, using the selected machine translator model, a first translated text element, the first translated text element resulting from a translation of the input text element in the first language into a second language based on the selected machine translation model; determine, using the post-editor module, a second translated text element based on the first translated text element, the second translated text element resulting from a predicted post-edit of the first translated text element; evaluate, using the quality evaluation module, a first quality metric corresponding to the first translated text element and a second quality metric corresponding to the second translated text element; and determine, at the quality evaluation module, the output translated text element based on the first quality metric and the second quality metric.

In at least one embodiment, the machine selector module may comprise a machine selector model, the machine selector model for selecting the selected machine translator model by classifying the input text element as in-domain for the selected machine translator model.

In at least one embodiment, the post-editor module may comprise a post-editing model, the post-editing model for generating the second translated text element by predicting the predicted post-edit.

In at least one embodiment, the quality evaluation module may comprise a quality evaluation model, the quality evaluation model for determining the first quality metric and the second quality metric.

In at least one embodiment, the plurality of machine translation models may comprise at least one of a statistical language translation model, a neural network language translation model, and a third party language translation model.

In at least one embodiment, if the input text element is in-domain of the third party language translation model, the first translated text element may be used as the output translated text element.

In at least one embodiment, the system may further comprise: the memory further comprising: a rule-based translator comprising a plurality of translation rules; the processor further configured to: determine, at the rule-based translator, if the input text element matches a candidate translation rule in the plurality of translation rules, and if so: determine the output translated text element based on the input text element and the candidate translation rule.

In at least one embodiment, each of the plurality of translation rules may comprise a regular expression.

In at least one embodiment, the system may further comprise: the memory further comprising: a cache; the processor further configured to: determine, at the cache, the presence of the input text element in the cache using the input text element as a cache key, and if the input text element is present in the cache: determine the output translated text element based on a cache value associated with the cache key; else: store the output translated text element in the cache using the input text element as the cache key.

In at least one embodiment, the processor may be further configured to: output the output translated text element to a display device.

In at least one embodiment, the processor may be further configured to: if the first and second quality metrics are less than a threshold: determine the output translated text element based on the third-party language translation model.

In at least one embodiment, the first quality metric, the first text element, the second quality metric, and the second text element may be provided to the post-editor model.

In a third aspect, some embodiments provide a computer implemented method for determining a plurality of machine translation models for language translation, the method comprising: providing a plurality of text element pairs, each text element pair comprising an input text element in a first language and a translated text element in a second language, the translated text element being a translation of the input text element from the first language to the second language; determining, at a language model generator, a plurality of machine translation models corresponding to a plurality of language pairs in the plurality of text element pairs, each of the plurality of language translation models for determining a first translated text element by translating an input text element; providing a plurality of machine classification data, each of the plurality of machine classification data comprising an input classification text element corresponding to a classification value; determining, at a machine selection model generator, a machine selection model based on the plurality of machine classification data, the machine selection model for determining a predicted in-domain language translation model in the plurality of language translations models for the input text element; providing a plurality of post-edited text element pairs, each of the post-edited text element pairs comprising an input pre-edited text element and a corresponding output post-edited text element; determining, at a post-editing model generator, a post-editing model based on the plurality of post-edited text element pairs, the post-editing model for determining a second translated text element based on the first translated text element; providing a plurality of quality evaluation data, each of the quality evaluation data comprising an input quality evaluation text element and a corresponding quality evaluation value; and determining, at a quality evaluation model generator, a quality evaluation model, the quality evaluation model for determining a quality metric corresponding to at least one of the first text element and the second text element.

In at least one embodiment the plurality of language translation models may be determined using word2vec.

In at least one embodiment the plurality of text element pairs may further comprise text element metadata and document metadata.

In at least one embodiment, the plurality of machine classification data may further comprise classification metadata, text element metadata, and document metadata.

In at least one embodiment, the plurality of post-edited text element pairs may further comprise pre-edit metadata, post-edit metadata, text element metadata, and document metadata.

In at least one embodiment, the plurality of quality evaluation data may further comprise quality evaluation metadata, text element metadata, and document metadata.

In a fourth aspect, some embodiments provide a system for determining a machine translation model for language translation, the system comprising: a memory, the memory comprising: a plurality of text element pairs, each text element pair comprising an input text element in a first language and a translated text element in a second language, the translated text element being a translation of the input text element from the first language to the second language; a plurality of machine classification data, each of the plurality of machine classification data comprising an input classification text element corresponding to a classification value; a plurality of post-edited text element pairs, each of the post-edited text element pairs comprising an input pre-edited text element and a corresponding output post-edited text element; a plurality of quality evaluation data, each of the quality evaluation data comprising an input quality evaluation text element and a corresponding quality evaluation value; a processor in communication with the memory, the processor configured to: determine a plurality of machine translation models corresponding to a plurality of language pairs in the plurality of text element pairs, each of the plurality of language translation models for determining a first translated text element by translating an input text element; determine a machine selection model based on the plurality of machine classification data, the machine selection model for determining a predicted in-domain language translation model in the plurality of language translations models for the input text element; determine a post-editing model based on the plurality of post-edited text element pairs, the post-editing model for determining a second translated text element based on the first translated text element; determine a quality evaluation model, the quality evaluation model for determining a quality metric corresponding to at least one of the first text element and the second text element.

In at least one embodiment the plurality of language translation models may be determined using word2vec.

In at least one embodiment, the plurality of text element pairs may further comprise text element metadata and document metadata.

In at least one embodiment, the plurality of machine classification data may further comprise classification metadata, text element metadata, and document metadata.

In at least one embodiment, the plurality of post-edited text element pairs may further comprise post-edit metadata, text element metadata, and document metadata.

In at least one embodiment, the plurality of quality evaluation data may further comprise quality evaluation metadata, text element metadata, and document metadata.

BRIEF DESCRIPTION OF THE DRAWINGS

A preferred embodiment will now be described in detail with reference to the drawings, in which:

FIG. 8B is a training data table illustrating exemplary data related to post-editing.

FIG. 9B is a training data table illustrating exemplary data related to quality evaluation.

DESCRIPTION OF EXEMPLARY EMBODIMENTS

Figure 1:
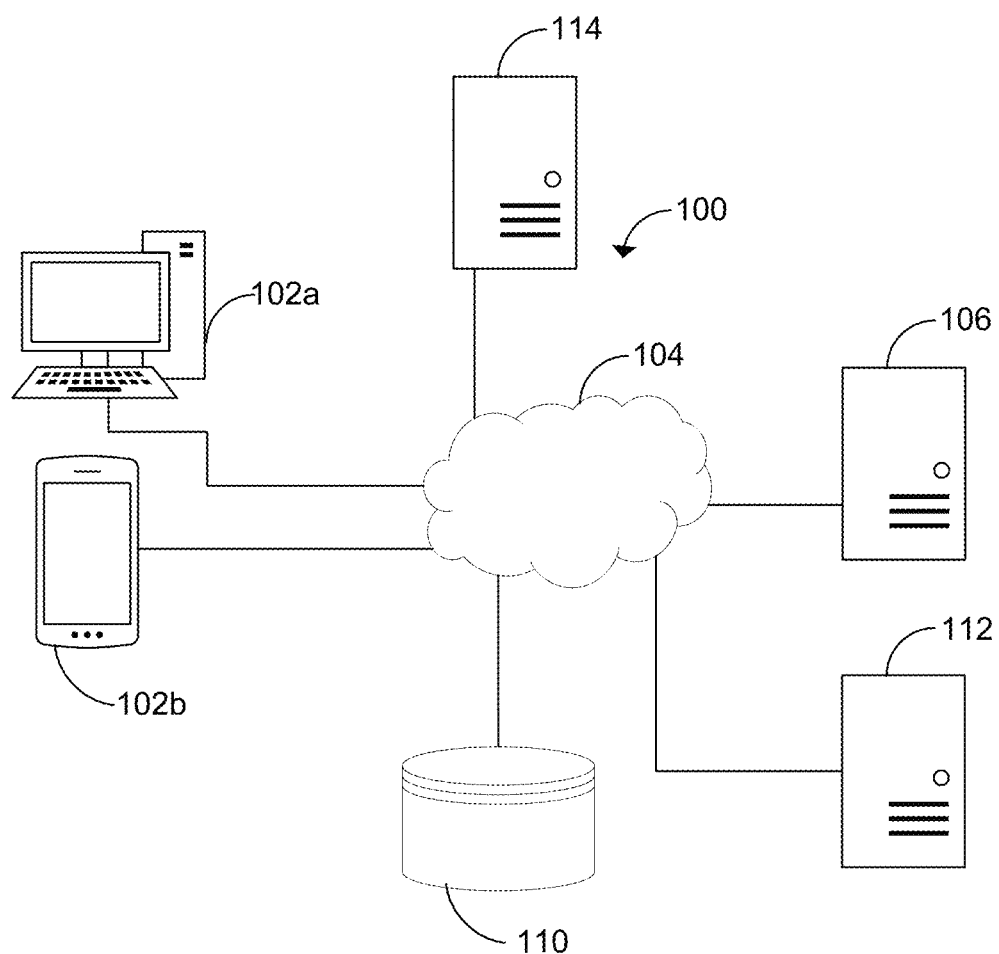
FIG. 1 is a system diagram of the language translation system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

Reference is first made to FIG. 1, which illustrates a language translation system 100. The system 100 has a plurality of user devices, represented by user devices 102a-102b, network 104, a translation server 106, a training server 112, and database 110. While translation server 106 and training server 112 are shown separately, the functionality they provide may be provided by a single server in some embodiments.

User devices 102 may be used by an end user to access an application (not shown) running on translation server 106 or training server 112 over network 104. For example, the application may be a web application, or a client/server application. The user devices 102 may be a desktop computer, mobile device, or laptop computer. The user devices 102 may be in network communication with translation server 106, and training server 112 via network 104. The user devices 102 may display the web application, and may allow a user to request machine translations, submit post-edits, submit machine classifications, and submit quality evaluations of machine translations. The user of user devices 102 may also be an administrator user who may administer the configuration of the translation server 106 and the training server 112.

The translation server 106 is in communication with the database 110, training server 112, and client server 114 along with user devices 102. The translation server may provide a web application, or a client/server application, and provides functionality to generate language translations.

The translation server 106 may accept as input a text element. The text element may be in a wide variety of formats, including various text encodings such as ASCII and Unicode. The translation server 106 receives from the training server 112 a plurality of language translation models, machine selection models, post-editing models, and quality evaluation models.

The translation server 106 may generate an output item, including an output text element. The output text element may be provided in a variety of different formats, such as HTML when the translation is requested through the web application, or JavaScript Object Notation (JSON) or eXtensible Markup Language (XML) when the translation is requested through an Application Programming Interface (API). The output text may be provided in the same format as was provided upon input.

The translation server 106 may provide an API endpoint for integration with a client software application on client server 114 to provide translations. This may allow a client software application to send language translation requests to the system 100. The training server 112 generates language translation models, machine selection models, post-editing models, and quality evaluation models. The training server 112 sends the plurality of language translation models, the machine selection models, the post-editing models, and the quality evaluation models to the translation server 106.

The language translation request may include a specified input language, an output language, an item to be translated such as one or more text elements, one or more documents, one or more databases, or a combination thereof. The language translation request may include metadata associated with the item to be translated. In one embodiment, the specified input language in the translation request may be optional and the language translation system 100 may detect the input language from the item to be translated. The translation server 106 may determine a translation of the text element in the translation request and transmit the output (or final) text element in a translation response.

The training server 112 may provide another API endpoint for integration with a client software application on client server 114 to provide for the generation of language translation models in the system 100. This may allow a client software application to send language model generation requests to the system 100. The training server 112 generates language translation models as described in FIG. 6. The training server 112 may also generate machine classification models as described in FIG. 7D, post-editing models as described in FIG. 8D, and quality evaluation models as described in FIG. 9D.

The language model generation request is handled by the language model generator 274, and the request may include an input language, an output language, and a document corpus comprising a plurality of translated items. Each translated item may include text inputs in an input language, such as one or more text elements, one or more documents, one or more databases, or a combination thereof. Each translated item further includes text outputs in an output language corresponding to translated versions of the associated text input, such as one or more text elements, one or more documents, one or more databases, or a combination thereof.

The document corpus may include metadata associated with each text element (both the input/source text elements and the output/translated text elements). A text element may be associated with a plurality of metadata. The metadata may include a user identifier associated with a user who submitted the input text element, a user identifier associated with a user who translated the input text element into the corresponding output text element, a machine translator identifier associated with the machine translation model used to translate the input text element into the corresponding output text element, one or more timestamps associated with the input text element (such as a created time, a modified time, etc), one or more timestamps associated with the input text element (such as a created time, a modified time, etc), the language of an input text element, and the language of a translated text element. If the input text element has been post-edited (see FIG. 8A-8D), the metadata associated with the input text element may include a text element identifier associated with the post-edited sentence. If the text element has had a quality evaluation performed (see FIGS. 9A-9D), the metadata may include a quality metric identifier associated with the quality evaluation. The text-element metadata may include a document identifier associated with a parent document, a paragraph identifier associated with a parent paragraph, and a phrase identifier. The text element metadata may include an associated client identifier, and a source identifier associated with the particular client application sourcing the text element. The text element metadata may include a text encoding such as UTF-8, and a text element size (in both number of characters and the size).

In one embodiment, the specified input language in the translation request may be optional and the language translation system 100 may detect the input language from the item to be translated.

Figures 7A, 7B:
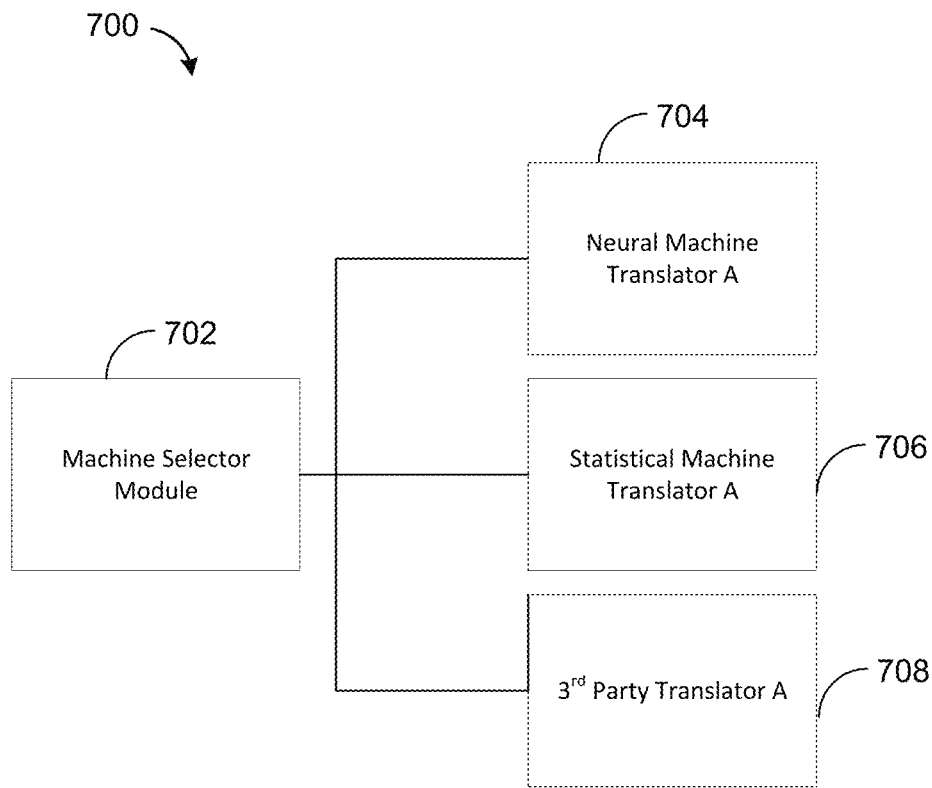
FIG. 7A is an example of a machine translation selector.
FIG. 7B is a training data table illustrating exemplary data related to machine translation selection.
Figure 7C:
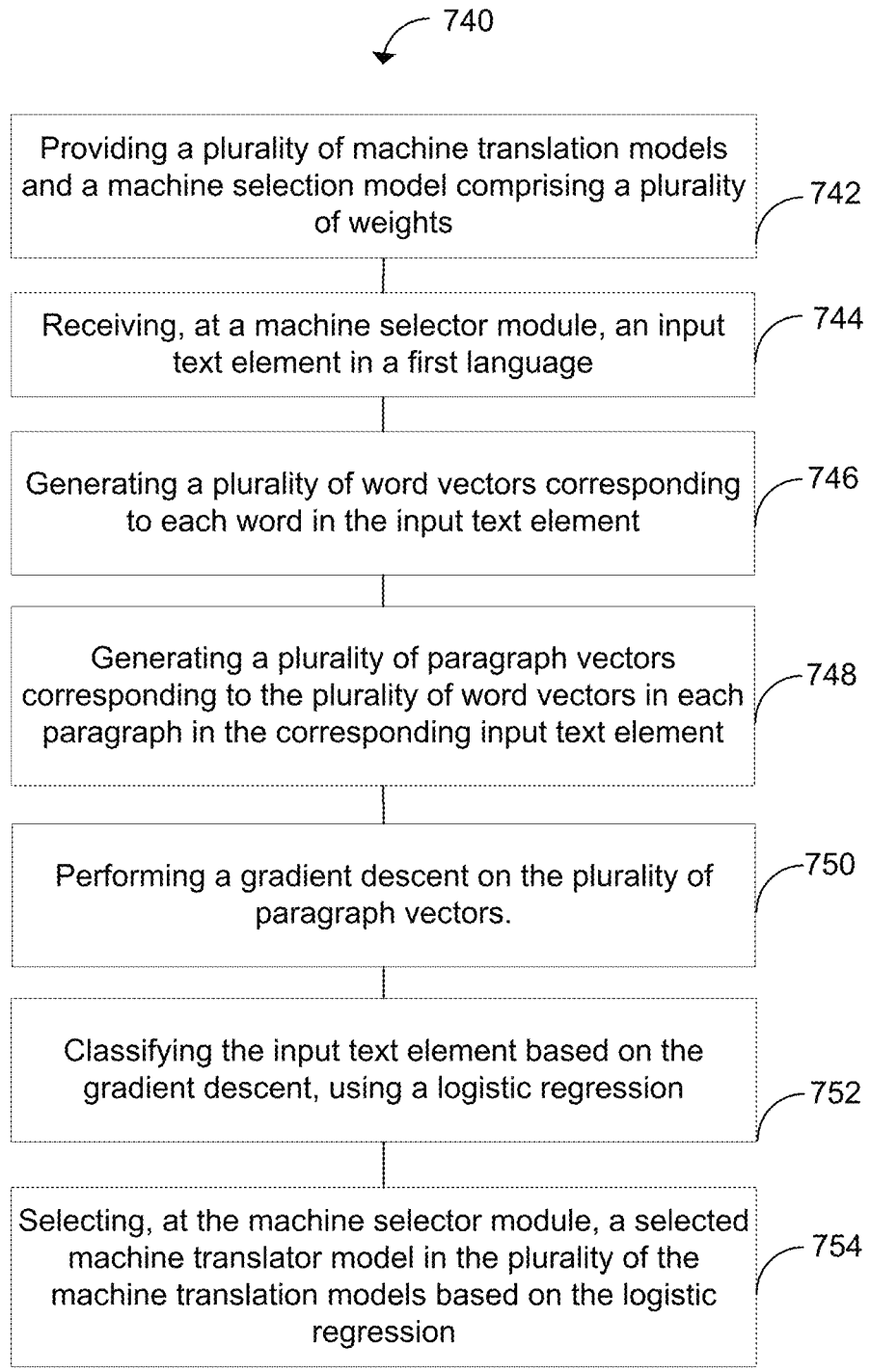
FIG. 7C is a flowchart of an example method of machine translation selection.
Figure 7D:
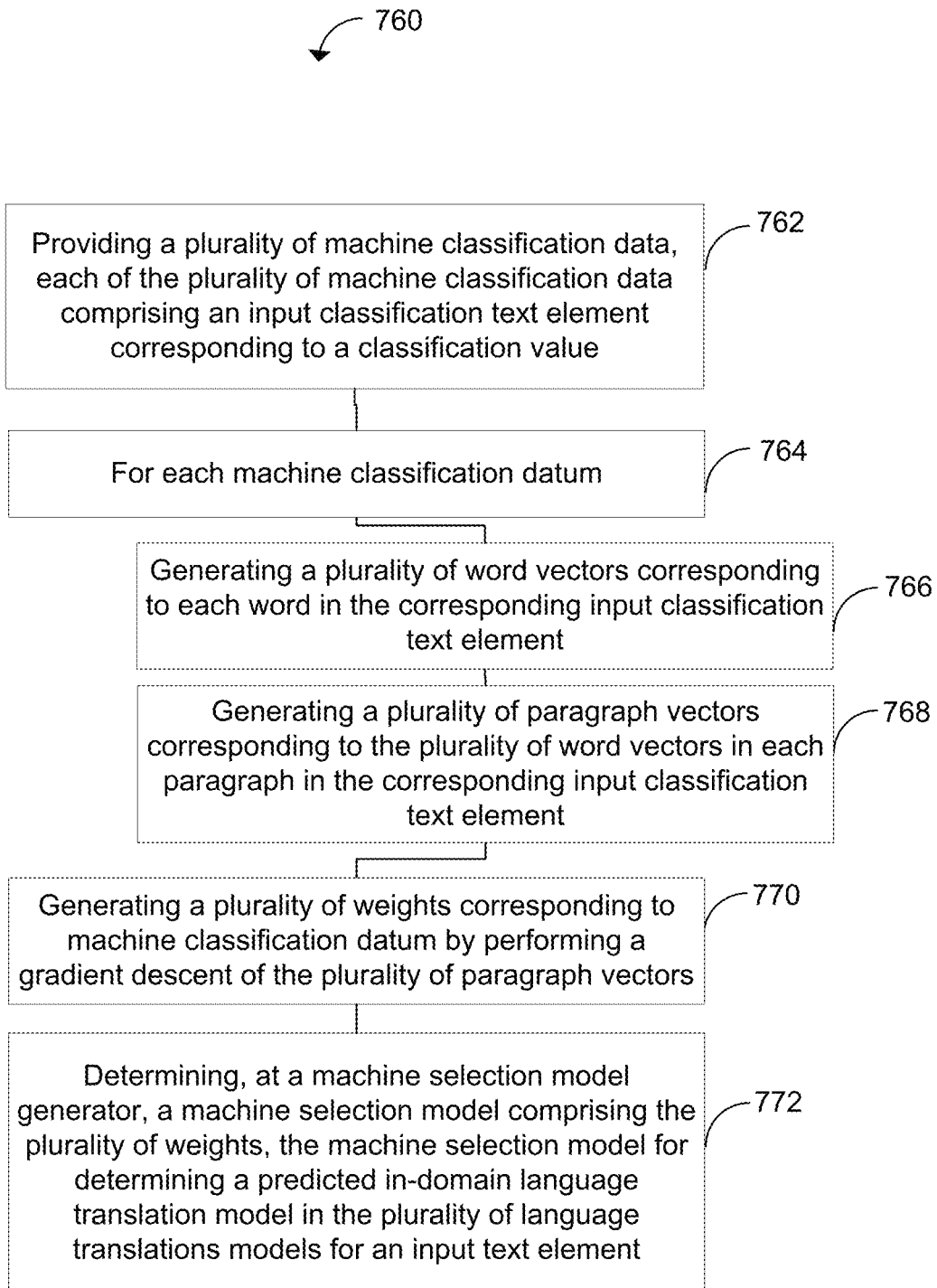
FIG. 7D is a flowchart of an example method of training a machine translation selection model.

In another embodiment, a machine selection model generation request may be received and handled by the machine selection model generator 276, the request may include machine classification data, and the request may be for the generation of a machine classification model as described in FIG. 7D.

Figure 8A:
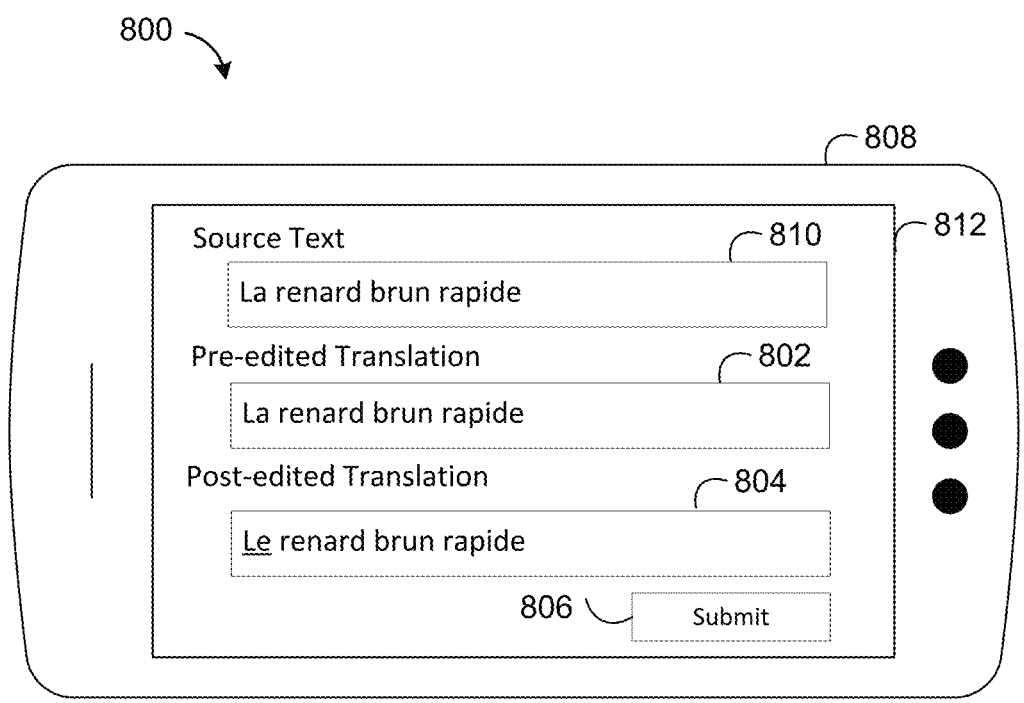
FIG. 8A is an example of a user interface for post-editing.
Figure 8C:
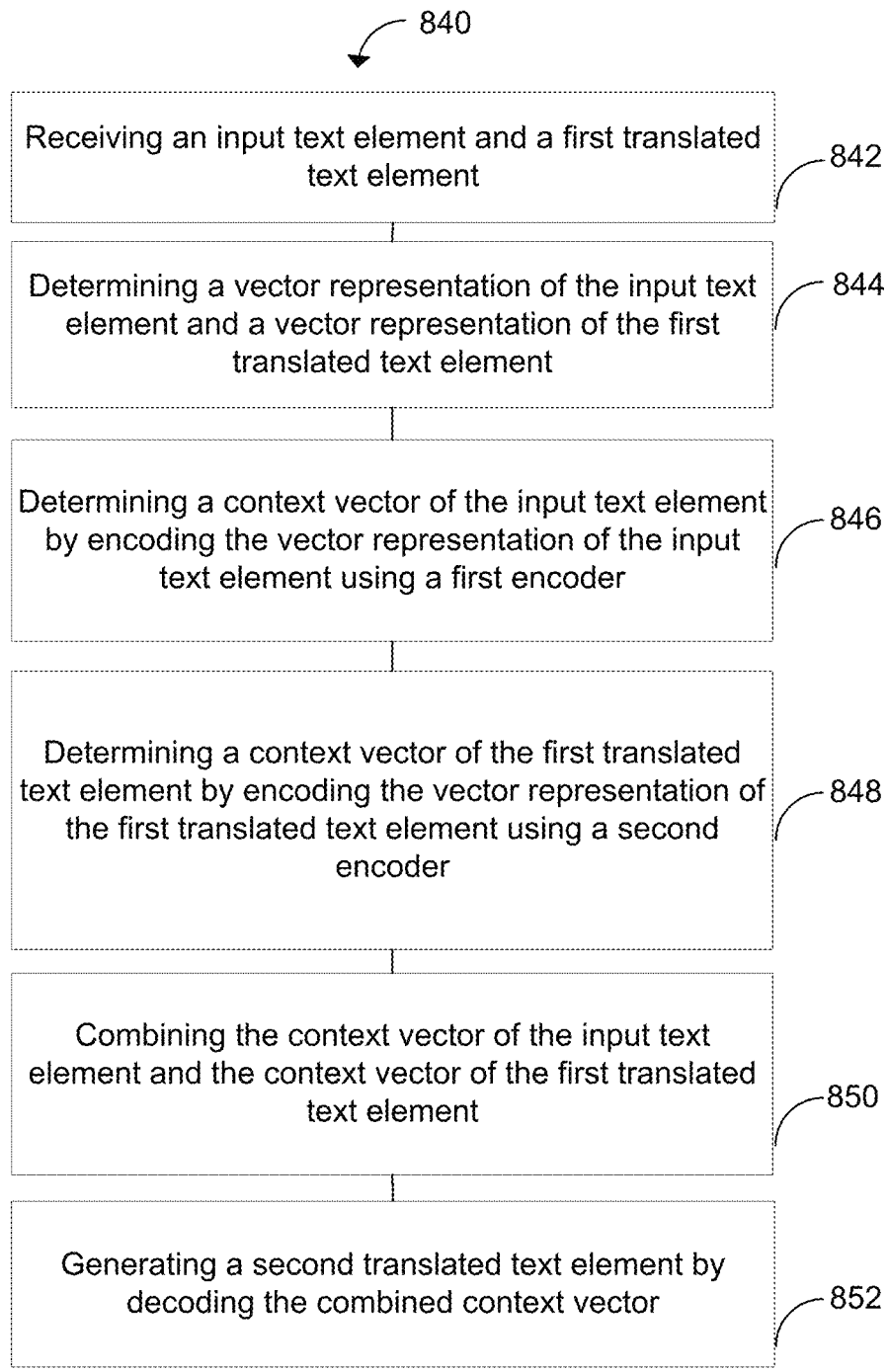
FIG. 8C is a flowchart of an example method of predicting a post-edit.
Figure 8D:
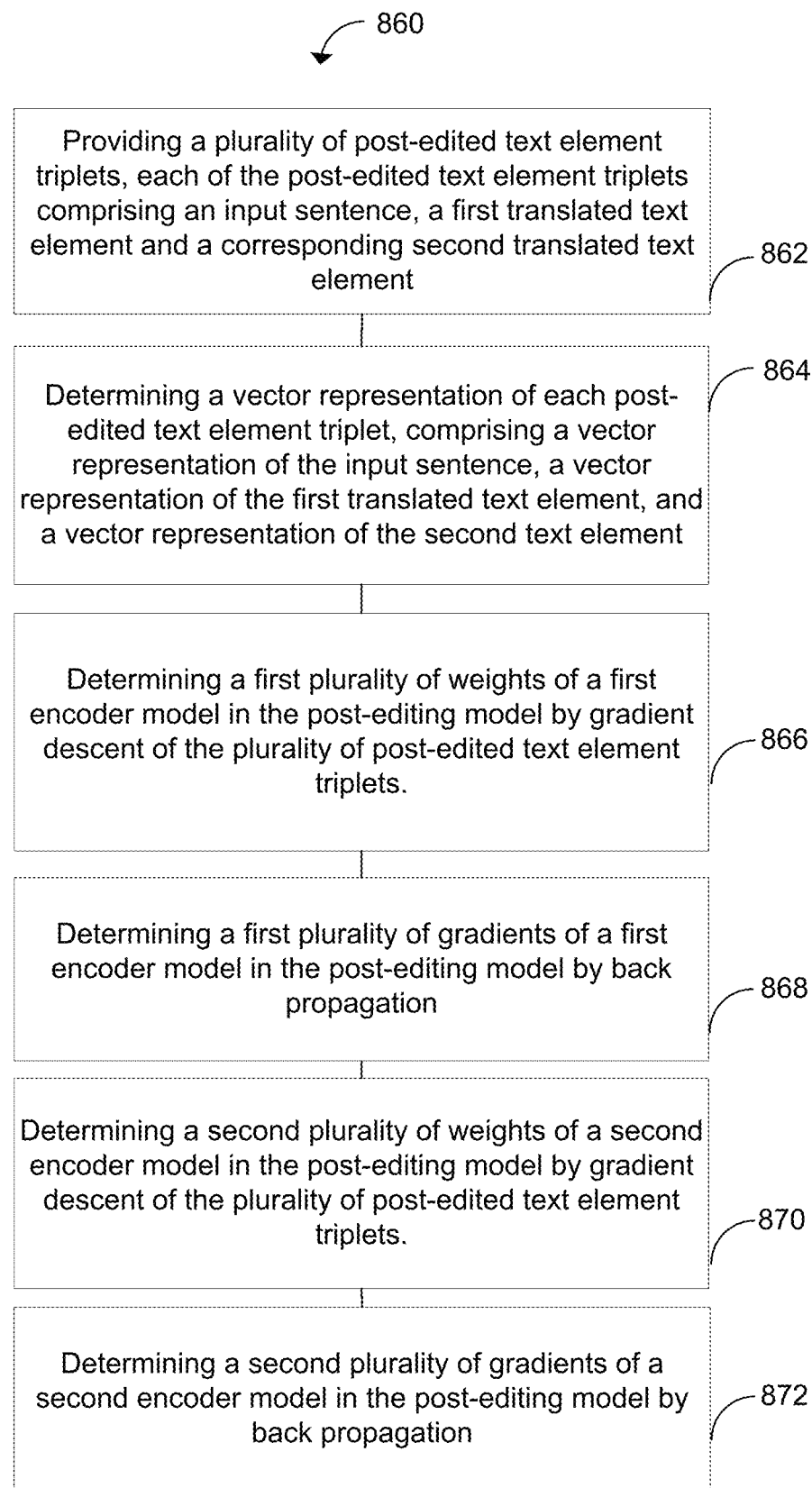
FIG. 8D is a flowchart of an example method of training a post-editing model.

In another embodiment, a post-editing model generation request may be received and handled by the post-editing model generator 278, the request may include post-editing data, and the request may be for the generation of a post-editing model as described in FIG. 8D.

Figure 9A:
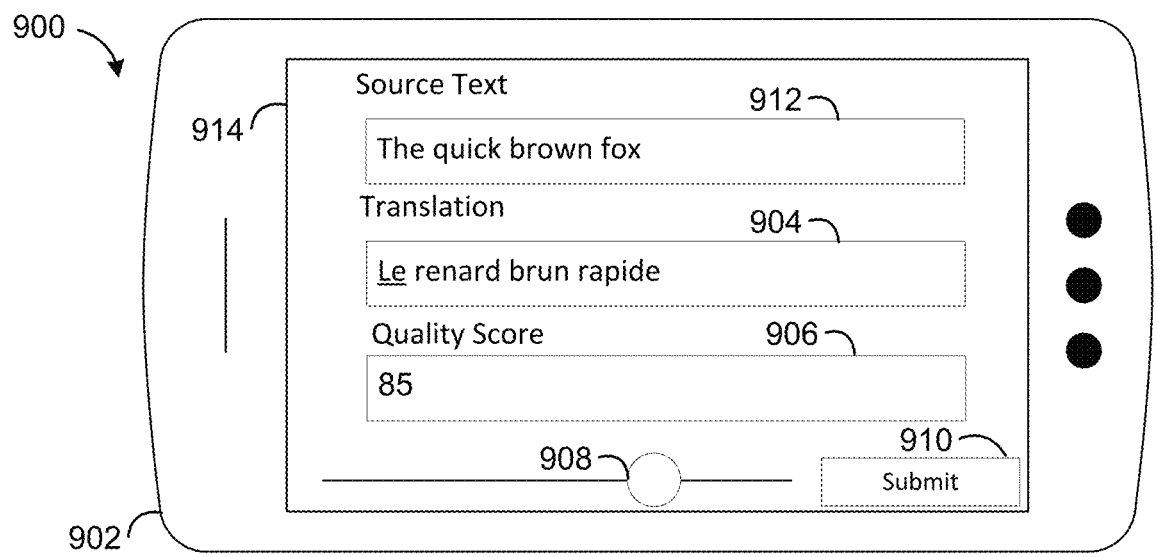
FIG. 9A is an example of a user interface for quality evaluation.
Figure 9C:
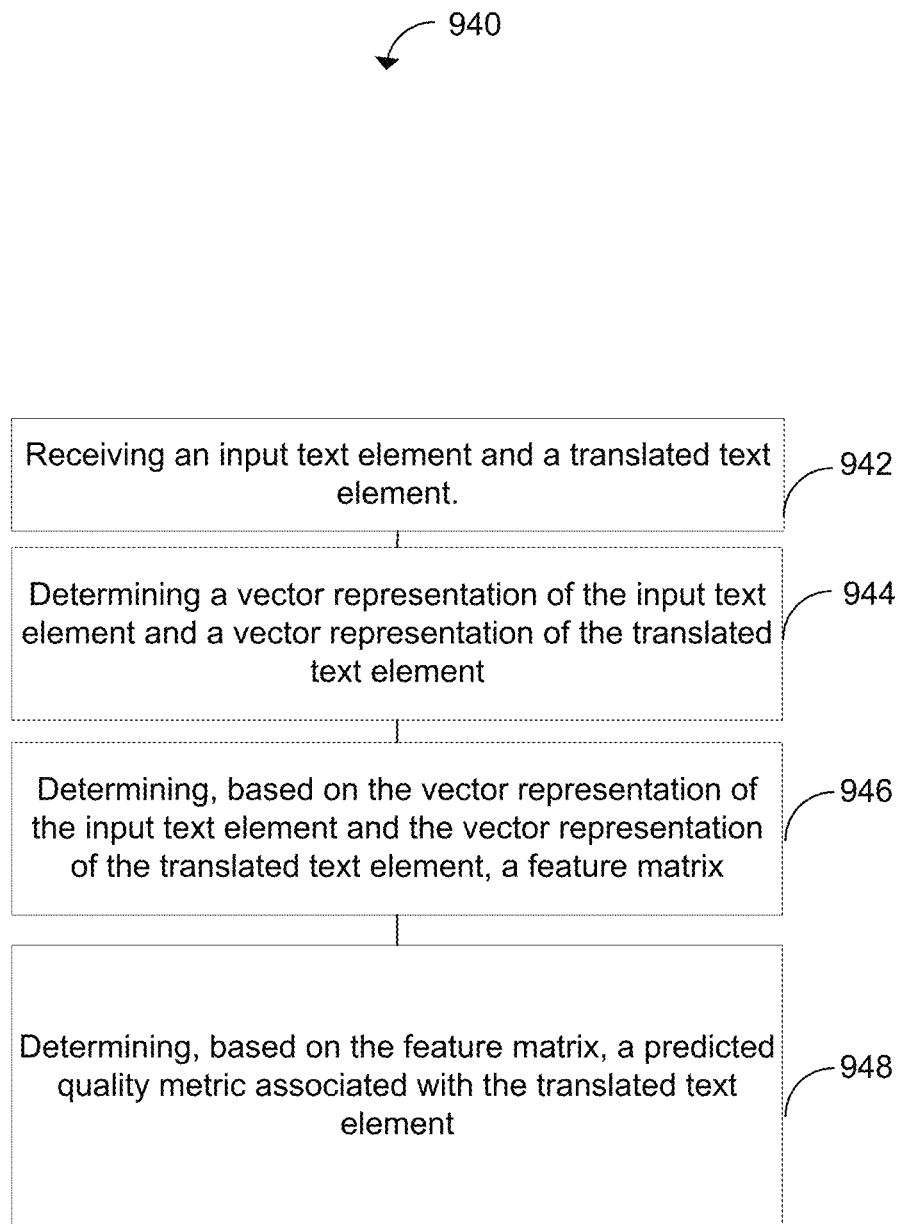
FIG. 9C is a flowchart of an example method of quality evaluation.
Figure 9D:
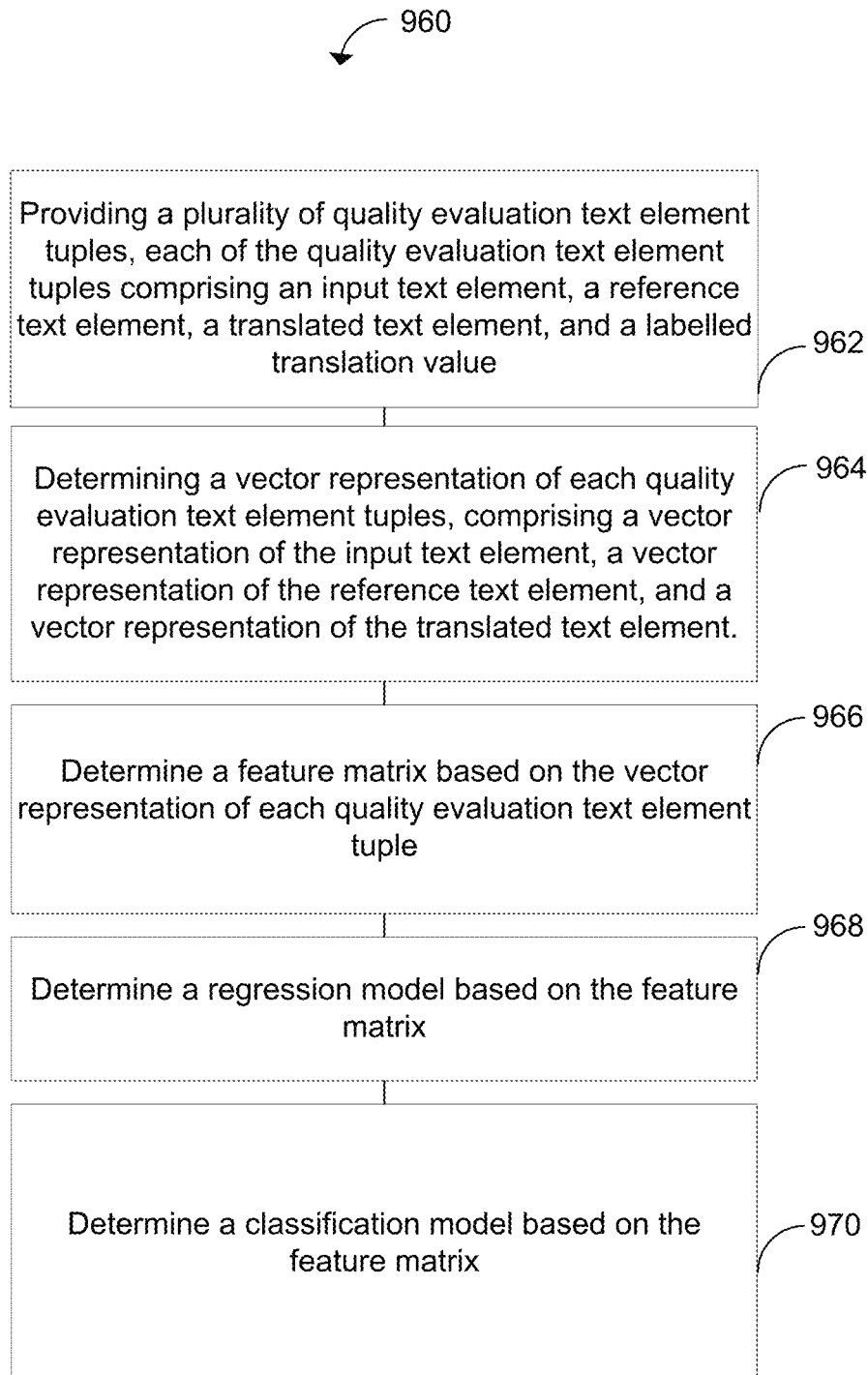
FIG. 9D is a flowchart of an example method of training a quality evaluation model.

In another embodiment, a quality evaluation model generation request may be received and handled by the quality evaluation model generator 228, the request may include quality evaluation data, and the request may be for the generation of a quality evaluation model as described in FIG. 9D.

Client server 114 may run a client application requiring language translation services from system 100. The client server 114 is in network communication with the translation server 106 and the training server 112.

Network 104 may be a communication network such as the Internet, a Wide-Area Network (WAN), a Local-Area Network (LAN), or another type of network. Network 104 may include a point-to-point connection, or another communications connection between two nodes.

The database 110 is connected to network 104 and may store translation information including language translation data sets (a language translation data set is also referred to herein as a "corpus"), machine classification data sets, post-editing data sets, quality evaluation data sets, rule-base translation data sets, and other language translation information. The database 110 may be a Structured Query Language (SQL) such as PostgreSQL or MySQL or a not only SQL (NoSQL) database such as MongoDB.

Figure 2A:
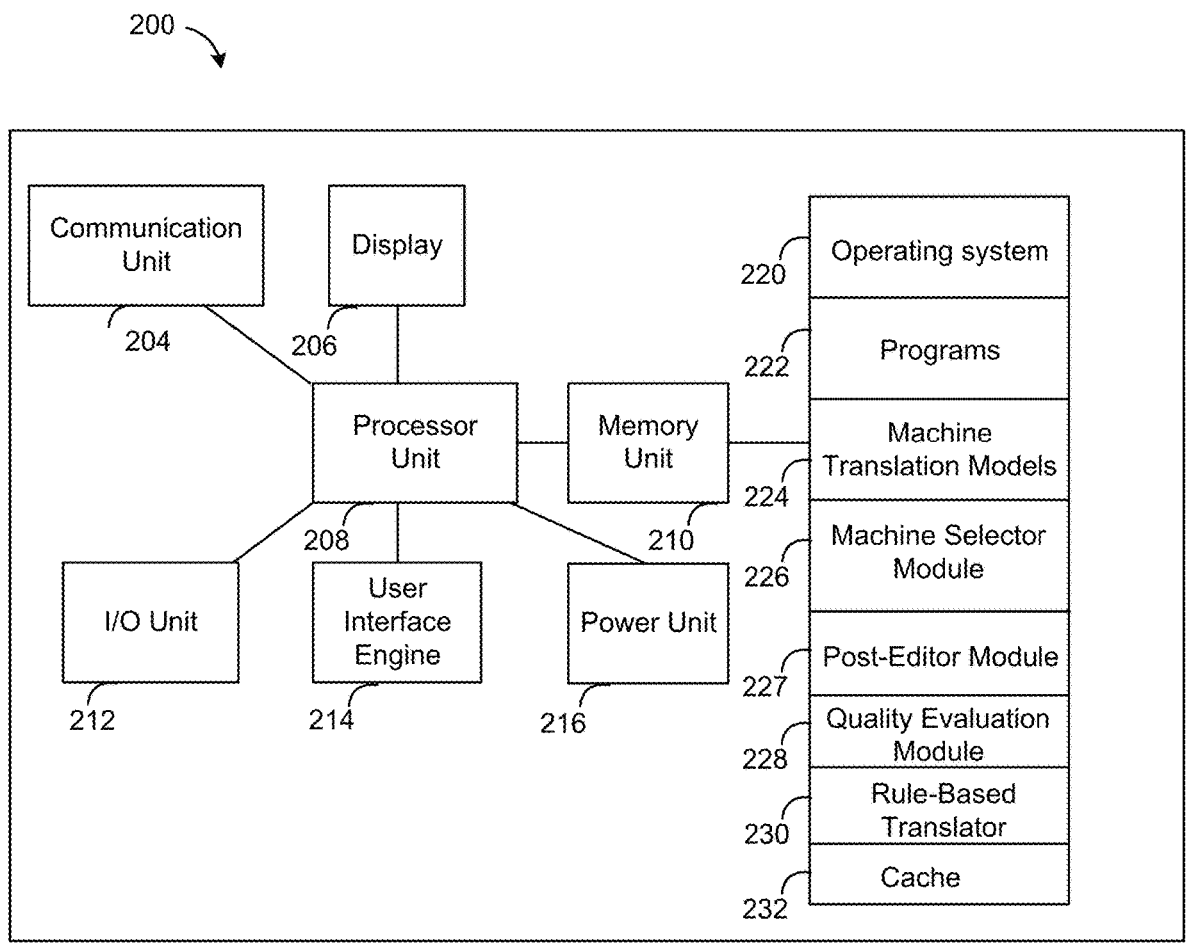
FIG. 2A is a block diagram of an embodiment of server 106 from FIG. 1 for language translation.

Reference is next made to FIG. 2A, showing a block diagram 200 of the translation server 106 from FIG. 1. The translation server 200 has communication unit 204, display 206, processor unit 208, memory unit 210, I/O hardware 212, user interface 214, and power unit 216. The memory unit 210 has operating system 220, programs 222, a plurality of machine translation models 224, a machine selector module 226, a post-editor module 227, a quality evaluation module 228, and a rule-based translator 230.

Figure 2B:
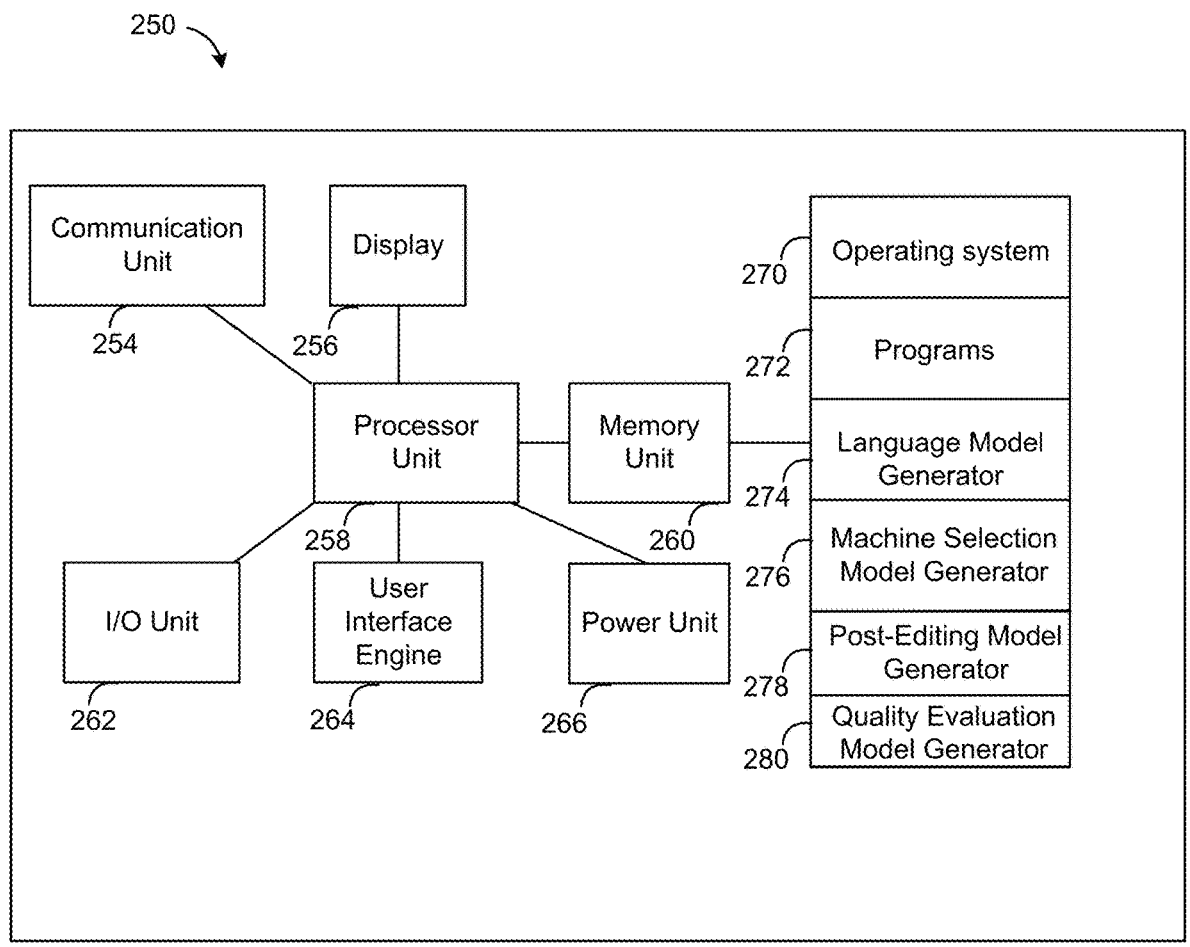
FIG. 2B is block diagram of another embodiment of the server 106 from FIG. 1 for training and model generation.

For FIGS. 2A-2B, like numerals refer to like elements, such as the communication unit 204, display 206, processor unit 208, memory unit 210, I/O hardware 212, user interface 214, power unit 216, and operating system 220.

The communication unit 204 may be a standard network adapter such as an Ethernet or 802.11x adapter. The processor unit 208 may include a standard processor, such as the Intel® Xeon® processor, for example. Alternatively, there may be a plurality of processors that are used by the processor unit 208 and may function in parallel.

The processor unit 208 can also execute a graphical user interface (GUI) engine 214 that is used to generate various GUIs, some examples of which are shown and described herein. The user interface engine 214 provides for language translation layouts, machine classification layouts, post-editing layouts, and quality evaluation layouts for users to request translations, and the information may be processed by the machine translation models 224, the machine selector module 226, the post-editor module 227, the quality evaluation module 228, and the rules-based translator 230.

The user interface engine 214 provides translation layouts for users to translated text elements from a first language to a second language. User interface engine 214 may be an API, a client-server application, or a Web-based application that is accessible via the communication unit 204.

Memory unit 210 may have an operating system 220, programs 222, a plurality of machine translation models 224, a machine selector module 226, a post-editor module 227, a quality evaluation module 228, and a rule-based translator 230.

The operating system 220 may be a Microsoft Windows Server operating system, or a Linux-based operating system, or another operating system.

The programs 222 comprise program code that, when executed, configures the processor unit 208 to operate in a particular manner to implement various functions and tools for the translation server 200.

The plurality of machine translation models 224 provides functionality for the translation of input text elements from a first language to a second language to generate a first translated text element. The plurality of translation models 224 may be general language translators, for example, English to German. Each machine translation model translates the text element from a first language to a second language, and produces a first output text element. The first output text element may be sent to the post-editor module 227 and the quality evaluation module 228. The input text element received at the selected machine translation model in the plurality of machine translation models 224 may be sent by the machine selector module 226.

In another embodiment, the plurality of translation models 224 may be domain specific translation models, for example there may be individual machine translators for Finance, Legal, Clothing, Electronics, Travel, and Sports within a group of English to German translators. The plurality of translation models may include both statistical and neural translation processes.

In another embodiment, the plurality of translation models 224 may include a combination of general language translators (for example, English to German) and domain specific translation models (for example, Finance, Legal, Clothing, Electronics for English to German translations).

A statistical translation model may provide language translation between a first language and a second language using a probabilistic model determined from a bilingual corpus of text elements. To determine a translated text element, a string of words may be determined that maximizes f* as follows:

$$f^* = \text{argmax } P(f|e) = \text{argmax } P(e|f)P(f) \quad \text{(equation 1)}$$

In equation 1, P(f) is referred to as the target language model, and represents how probable a given sentence is in the target language. P(e|f) is referred to as the translation model, and represents how probable a first language text element is as a translation for a given text element in a second language. The translation model may be determined using Bayes Theorem or another suitable algorithm. The statistical translation models may include word-based translation models, phrase-based translation models, and syntax-based translation models.

The method of translation for a statistical translation model is generally as follows: first a text element in a first language is broken up into phrases. Next, for each phrase a corresponding phrase in a second language is determined. Finally, a permutation of the translated phrases is selected.

The resulting set of permutations are evaluated and a nearly-most-probable translation is chosen as the output text element. The above statistical translation method may be modified to incorporate other known statistical translation steps.

A neural translation model may employ a pair of Recurrent Neural Networks (RNNs).

The first RNN accepts input text elements for translation and produces an internal fixed-length representation, also known as the context vector (an encoder). The encoder transforms the input text element into a list of vectors, including one vector per input symbol. For example, with an input text element $X = x_1, x_2, x_3, \ldots, x_m$ and an output text element $Y = y_1, y_2, y_3, \ldots, y_n$. The set of vectors (bolded) produced by the encoder may be determined as follows:

$$x_1, x_2, x_3, \ldots, x_m = \text{EncoderRNN}(x_1, x_2, x_3, \ldots, x_m) \quad \text{(equation 2)}$$

The conditional probability of the sequence P(Y|X) is as follows:

$$P(Y \mid X) = P(Y \mid x_1, x_2, x_3, \ldots, x_m) \quad \text{(equation 3)}$$

$$= \prod_{i=1}^{N} P(y_i \mid y_0, y_1, y_2, \ldots, y_{i-1}; x_1, x_2, x_3, \ldots, x_m)$$

The second RNN is for generating output text elements based on the context vector (a decoder). A neural translation model may include an attention mechanism to address situations where long text elements are used as input. During language translation, the probability of the next symbol in the output text element Y is determined given the input text element and the decoded output text element translated so far:

$$P(y_i \mid y_0, y_1, y_2, \ldots, y_{i-1}; x_1, x_2, x_3, \ldots, x_m) \quad \text{(equation 4)}$$

In some embodiments, the neural translators in the plurality of translation models 224 may include an attention layer. The attention layer may include a local attention model and a global attention model. The global attention model may represent hidden states of an encoder when determining a context vector. The global attention model may use a location-based function for determining alignment scores of a vector representation of an input text element. The local attention model may predict a single aligned position for the current word being translated, and a window centered around the single aligned position to determine a context vector.

In another embodiment, the neural translation model may be a Transformer.

Like an RNN based machine translation model, Transformer based machine translation model may consist of two modules, an encoder and a decoder.

The encoder accepts input text elements for translation and generates a vector representation of all words in source text. The decoder accepts the vector representation and generates a corresponding sequence of words as an output text element. The input and output of the encoder and decoder are similar to the first RNN and second RNN as described above, however the underlying architecture and method of the encoder and decoder of the Transformer are different from the pair of RNNs.

The encoder of the Transformer may have a plurality of layers where each layer is further composed of two components. The first component constitutes a multi-head self-attention mechanism that is applied to each token of input text, and second component consists of fully connected feed forward network.

A self-attention mechanism functions by processing an input token, and associating the current token with other token positions in the sequence of input tokens for information and clues that may provide a better encoding of the input token.

The decoder of the Transformer may have a plurality of layers where each layer is composed of three components. Two of the components are a multi-head self-attention mechanism and fully connected feed forward network. In addition to these two components, there is a third component which performs multi-head attention over the output of encoder layer.

The multi-head attention mechanism consists of an attention function which determines a Query (Q) vector and a set of Key(K)-Value(V) vector pairs from the input token, and transforms Q, K and V to an output vector. The output vector may be a weighted sum of Value vectors where the weight assigned to each Value vector is computed by a function of Query vector with the corresponding Key vector.

The attention mechanism may proceed as follows.

$$\text{Attention } (Q, K, V) = \text{softmax}\left(\frac{QK^T}{\sqrt{d_k}}\right)V$$

Where Q, K and V represents Query, Key and Value vectors respectively and $d_k$ represents the dimension of Key vectors. The softmax function may be used to compute the weights for Value vectors. $K^T$ refers to a matrix transposition of the key matrix.

In a multi-head attention method, the attention function may be repeated multiple times with different learned vector representation Query, Key and Value vectors.

The multi-head attention method in a Transformer may function in three ways. First, multi-head attention may be determined or performed by the encoder over one or more tokens of an input text element in a source language. Query, Key and Value vectors may be determined from the tokens of input text in source language thus may be called self-attention mechanism. Second, multi-head attention in the decoder may be performed over tokens decoded as an output text element corresponding to a translation in a target language. In this second case, all Query, Key and Value vectors may be from same location—tokens from the output text element (the resultant translation). Third, multi-head attention may be applied across both the encoder and decoder. In this case, Query vectors may come from decoder and Key and Value vector pairs may come from the output of encoder.

In another embodiment, the neural translation model may be an Evolved Transformer (ET), which may provide improved results in a range of language tasks. In order to generate the ET, a large search space may be constructed. The ET may incorporate advances in feed-forward sequence models, and may execute an evolutionary architecture search with warm starting by seeding the initial population of Transformer models.

Two methods may be used to create the Evolved Transformer architecture: Tournament Selection Evolutionary Architecture Search (TSEAS) and Progressive Dynamic Hurdles (PDH).

TSEAS may be conducted by first defining a gene encoding that describes a neural network architecture, in our case is the Transformer architecture. An initial population may be created by randomly sampling from the space of our Transformer gene encodings to create individuals with each individual corresponding to a neural architecture. These individuals may be trained and assigned fitness, where the fitness may be determined by the model's negative log perplexities on the Workshop on Machine Translation 2014 (WMT'14) English-German validation set. The population may be then repeatedly sampled from to produce sub-populations, from which the individuals with highest fitness may be selected as a parent. Selected parents may have their gene encodings mutated to produce child models. The child models may then be trained and evaluated. The population may again be sampled and individuals in the sub-population with lowest fitness may be removed from the population and newly evaluated child models may be added to the population. This process is repeated and may result in a population of high-fitness individuals, meaning high-fitness architectures.

The training and evaluation of a Transformer model on the WMT' 14 English-German validation has high resource and time requirements, and the application of the TSEAS method to produce high fitness models may be very expensive. To address these high resource and time requirements, Progressive Dynamic Hurdles (PDH) may be used. PDH may allow models that consistently perform well to train for more steps, and may halt models that do not consistently perform well earlier. The PDH method may begin similar to the ordinary TSEAS method, but with early stopping, with each child model training for a small number of steps before evaluation. First, a predetermined M child models are evaluated after $S_0$ steps of training, then a hurdle $H_0$ may be introduced by averaging these models' fitness. Then for the next M child models, those models which achieve a fitness higher than $H_0$ after $S_0$ steps may be granted an extra $S_1$ training steps and evaluated again to get their final fitness. Next another hurdle $H_1$ may be obtained by determining the mean fitness of all current population. For the subsequent M child models, training and evaluation may follow the same fashion. This process may be repeated until a satisfactory number of maximum training steps is reached. The benefit of altering child models this way may be that poor performing child models will not consume as many resources when their fitness is being computed. The resources saved as a result of discarding many bad models may improve the overall quality of the search enough to justify potentially also discarding some good ones.

In another embodiment, the plurality of translation models may include $3^{rd}$ party translation models such as Google® Translate®. In the case where a $3^{rd}$ party translation model is used, the translation system may implement $3^{rd}$ party library code to provide language translation using a $3^{rd}$ party service. The $3^{rd}$ party models may be used as a translation model for particular domains not in the domain specific translators of the plurality of translation models. The translated text elements generated by the $3^{rd}$ party models may be sent to the post-editor module and the quality evaluation module, or alternatively, the translated text elements generated by the $3^{rd}$ party models may be used as the final translated text elements directly.

The machine selector module 226 determines, based on an input text element, which of the plurality of machine translation models is "in-domain" for the input text element. The machine selector module 226 may be rule-based, and may select a translation model in the plurality of machine translation models based on the application of a ruleset.

In another embodiment, the machine selector module 226 may use a classifier machine learning model that is determined based on a training set of previously classified sentences. The previously classified sentences may be a set of previously human-classified sentences. The classification may be based on the text data of the sentence, and on sentence metadata.

The machine selector module 226 may receive the input text element when the rule-based translator 230 does not match the input text element. The machine selector module 226 may select a plurality of different machine translation models for text elements originating from the same document. For example, a finance document being translated from English to French may have a domain specific finance machine translation model used for text elements in some parts of the document, and may have a $3^{rd}$ party translation model used for other text elements in the document.

The machine selector module 226 is a machine learning classifier that selects one model from the plurality of machine translation models for the translation of the text element. The machine selector module 226 may use the doc2vec algorithm and logistic regression based machine learning algorithm to classify sentences as either in-domain or out-of-domain for each of a plurality of machine translation models, including statistical machine translation models, neural machine translation models, and $3^{rd}$ party translation models.

In an alternate embodiment, the machine selector module 226 may use a Bidirectional Encoder Representations for Transformers (BERT) algorithm and logistic regression machine learning algorithm to classify sentences as either in-domain or out-of-domain.

The machine selector module 226 may receive feedback from the quality evaluation module 228. The feedback from the quality evaluation module 228 may be used in future training of the machine selector model to improve the accuracy of machine selection predictions.

The machine selector module 226 may determine the best translation model to be used for a text element based on pre-determined goal parameters such as quality metrics, language metrics, or cost metrics (or a combination thereof).

Further details of the machine selector module are reviewed in FIGS. 7A-7D.

The post-editor module 227 functions to predict post-edits to the first translated text element. The predicted post-edits may be applied to the translated text element in a second text element. The post-editor may receive the first translated text element from the selected machine translator in the plurality of machine translation models 224. The post-editor module 227 may send the generated second text element to the quality evaluation module 228. The generated post-edits, including the first translated text element and the second translated text element may be associated with each other and stored in a database (for example, database 110 in FIG. 1).

The post-editor module 227 may be rule-based, and may perform post-edits based on a set of predetermined rules in a ruleset.

In an alternate embodiment, post-editor module 227 may have a neural network based machine translation model for predicting post-edits of the first translated text element. The neural network may be a deep neural network.

Further details of post-edit prediction by the post-editor module are reviewed in more detail in FIGS. 8A-8D.

The quality evaluation module 228 functions to predict quality evaluation metrics of the first translated text element and the second translated text element. The predicted quality metrics may be numerical (i.e. a range from 0-1, or 0-100), or may be categorical (i.e. letter categories "A", "B", "C", "D", or "Good", "Mediocre", "Bad", etc.). The quality evaluation module 228 receives the first translated text element from the selected machine translation model in the plurality of machine translation models, and the second translated text element from the post-editor module.

The quality evaluation module 228 determines a first quality metric associated with the first translated text element and a second quality metric associated with the second translated text element. The quality metrics may be determined use a rules-based approach, whereby a set of predetermined rules are identified in a ruleset that identifies text element quality.

In an alternate embodiment, the first quality metric and the second quality metric may be sent as feedback to the post-editing module 227, and may be incorporated into the post-editing model. The quality metrics generated by the quality evaluation module may be stored in a database (for example, database 110 in FIG. 1) with the associated text element.

In an alternate embodiment, the quality evaluation module 228 may determine quality metrics using the Bilingual Evaluation Understudy (BLEU) algorithm. The BLEU metrics generally determine the level of correspondence between a machine's translation output text element in a second language based on an input text element in a first language as compared to a professional human translator. A BLEU score is a quality score metric determined using a linear regression. The BLEU score may be determined based on a number of features, including basic sentence features such as number of tokens in sentence, average token length etc., n-gram related features such as number of unique trigrams in sentence without padding, four-gram language model probability of sentence etc., punctuation-related features such as absolute difference between the number of punctuations marks of source and target sentence, absolute difference between number of periods in source and target sentences normalized by source sentence length, etc., digit-related features such as percentage of digits in the sentence, absolute difference between number of numbers in the source and target sentences, etc., linguistic features such as perplexity of sentence, the number of stop-words in the sentence, sentence four-gram log-probability normalized by sentence length, ratio of percentage of nouns in the source and target sentences, etc.

In an alternate embodiment, the quality evaluation module 228 may have a quality evaluation model that may predict the quality metrics associated with a machine's translation output text element in a second language based on an input text element in a first language using a neural network. The predicted quality metrics based on the neural network may be determined using a model determined from a corpus of historical quality evaluations by human evaluators.

The quality evaluation model 228 may determine a final text element based on the first quality metric and the second quality metric. For example, the final text element may be selected by the quality evaluation module 228 based on the highest quality metric of the first quality metric and the second quality metric.

In an alternate embodiment, the quality evaluation model 228 may compare the generated first quality metric and the second quality metric to a threshold, and if both metrics are below the threshold, may transmit the input text element to a $3^{rd}$-party translation model in the plurality of translation models 224 to generate the final text element (instead of selecting from the first translated text element and the second translated text element).

In one embodiment, once the final text element is selected by the quality evaluation module, it is stored in cache 232.

Further details of the quality evaluation model of the quality evaluation module are presented in FIGS. 9A-9D.

Rule-based translator 230 may optionally be used to perform translations based on a pre-determined set of matching rules. The rule-based translation has a plurality of translation rules, and the rules are applied to input text elements matching the condition of the rule.

The rule-based translator 230 may apply its rules prior to the input text element sent to the machine selector module 226 if the input text element matches the rule. If no rules match the input, the input text element may then proceed to the machine selector module 226.

Each rule in the rule-based translator 230 may be implemented using a regular expression. A regular expression may therefore apply before an input text element is selected for translation at a machine translation model in the plurality of machine translation models. The regular expression may therefore override the translation decisions of the plurality of translation models to provide culturally relevant output, for example moving a currency sign to after the number or replacing a decimal with a comma. In a specific example, the rule-based engine may be used, when there is particular matching "boilerplate" text in a securities document.

Cache 232 may be an in-memory collection of text element values referenced by a cache key. The cached values may be commonly translated text elements, and the provision of the cache may improve the translation performance of the system. The cache key may be the input text element, or a hash of the input text element. Newly translated text elements may be stored in the cache 232 by the quality evaluation module 228. As the cache 232 reaches capacity, newly translated text elements may be added using a Least-Recently Used (LRU) cache replacement policy. The cache 232 may be in memory, or alternatively may be stored on disk at the translation server 200.

Cache 232 may be a software package such as memcached, redis, etc.

I/O hardware 212 provides access to server devices including disks and peripherals. The I/O hardware provides local storage access to the programs 222 running on translation server 200.

The power unit 216 provides power to the translation server 200.

Referring next to FIG. 2B, a block diagram 250 of the training server 112 from FIG. 1 is shown. The training server 250 has communication unit 254, display 256, processor unit 258, memory unit 260, I/O unit 262, user interface 264, and power unit 266.

The memory unit 260 has operating system 270, programs 272, language model generator 274, machine selection model generator 276, post-editing model generator 278, and quality evaluation model generator 280.

The programs 272 comprise program code that, when executed, configures the processor unit 258 to operate in a particular manner to implement various functions and tools for the training server 250.

The language model generator 274 is used by the training server 250 to generate models by training them based on historical data. To perform training, the language model generator may query the database (see e.g. ref 110 in FIG. 1) to locate a plurality of historical language translation records. The plurality of language translation records may include a bilingual corpus including input text elements and output translated text elements.

In an alternate embodiment, the plurality of language records used for training may be a monolingual dataset.

A statistical machine translation model may be generated by the language model generator 274. In this case, the translation model is learned from a bilingual corpus including a collection of pairs of text elements, one text element in a first language and a corresponding text element in a second language. The translation model generation may include the contents of the document corpus, and further may include any metadata associated with text elements in the document corpus as described herein.

The training of the statistical machine translation model may generally involve aligning the text elements of the parallel corpora. This may involve determining the pairs of text elements as between the parallel corpora. In practice, long text elements may be split up into smaller text elements, and short text elements may be combined with other short text elements. The text element alignment may be determined using the Gale-Church alignment algorithm.

The pairs of parallel text elements may determine a word alignment, for example, again using the Gale-Church alignment algorithm.

The word alignments may then be used to determine a translation model and a language model for the statistical machine translation model.

The statistical machine translation model may be binarized in order to improve performance and memory usage.

A model for a neural machine translator may be generated by the language model generator 274. In this case, the translation model is learned from a monolingual corpus including a collection of text elements in one language.

From the collection of text elements, a word embedding may be determined by the language model generator 274. The word embedding may be generated using a word2vec algorithm.

Using the word embedding, an encoder may be used to determine a neural translation model. For example, the encoder may be a sequence to sequence encoder such as a bidirectional RNN encoder, a Transformer encoder, or an Evolved Transformer encoder. The encoder may further use an attention layer to improve the accuracy of translation.

A machine selection model generator 276 may generate a machine selection model based on a set of historical machine classification data. To perform training, the machine selection model generator 276 may query the database (see e.g. ref 110 in FIG. 1) to locate a plurality of historical machine classification records. The training of the machine selection model is described in further detail in FIG. 7D.

Once generated, the machine selection model may be stored in a database (see e.g. ref 110 in FIG. 1), and may be cached. The machine selection model is used by the translation server to determine an in-domain machine translation model based on an input text element.

A post-editing model generator 278 may generate a post-editing model based on a set of historical post-editing data. To perform training, the post-editing model generator 278 may query the database (see e.g. ref 110 in FIG. 1) to locate a plurality of historical post-editing records. The training of the post-edit model is described in further detail in FIG. 8D.

Once generated, the post-edit model may be stored in a database (see e.g. ref 110 in FIG. 1), and may be cached. The post-edit model is used by the translation server to predict a post-edit to a first translated text element, and to generate a second translated text element based on the first translated text element and the predicted post-edit.

A quality evaluation model generator 280 may generate a quality evaluation model based on a set of historical quality evaluation data. To perform training, the quality evaluation model generator 280 may query the database (see e.g. ref 110 in FIG. 1) to locate a plurality of historical quality evaluation records. The training of the machine selection model is described in further detail in FIG. 9D.

Once generated, the quality evaluation model may be stored in a database (see e.g. ref 110 in FIG. 1), and may be cached. The quality evaluation model may be used by the translation server to predict a quality metric for the first translated text element and the second translated text element. These quality metrics may be used to select a final (or output) text element.

Figure 3:
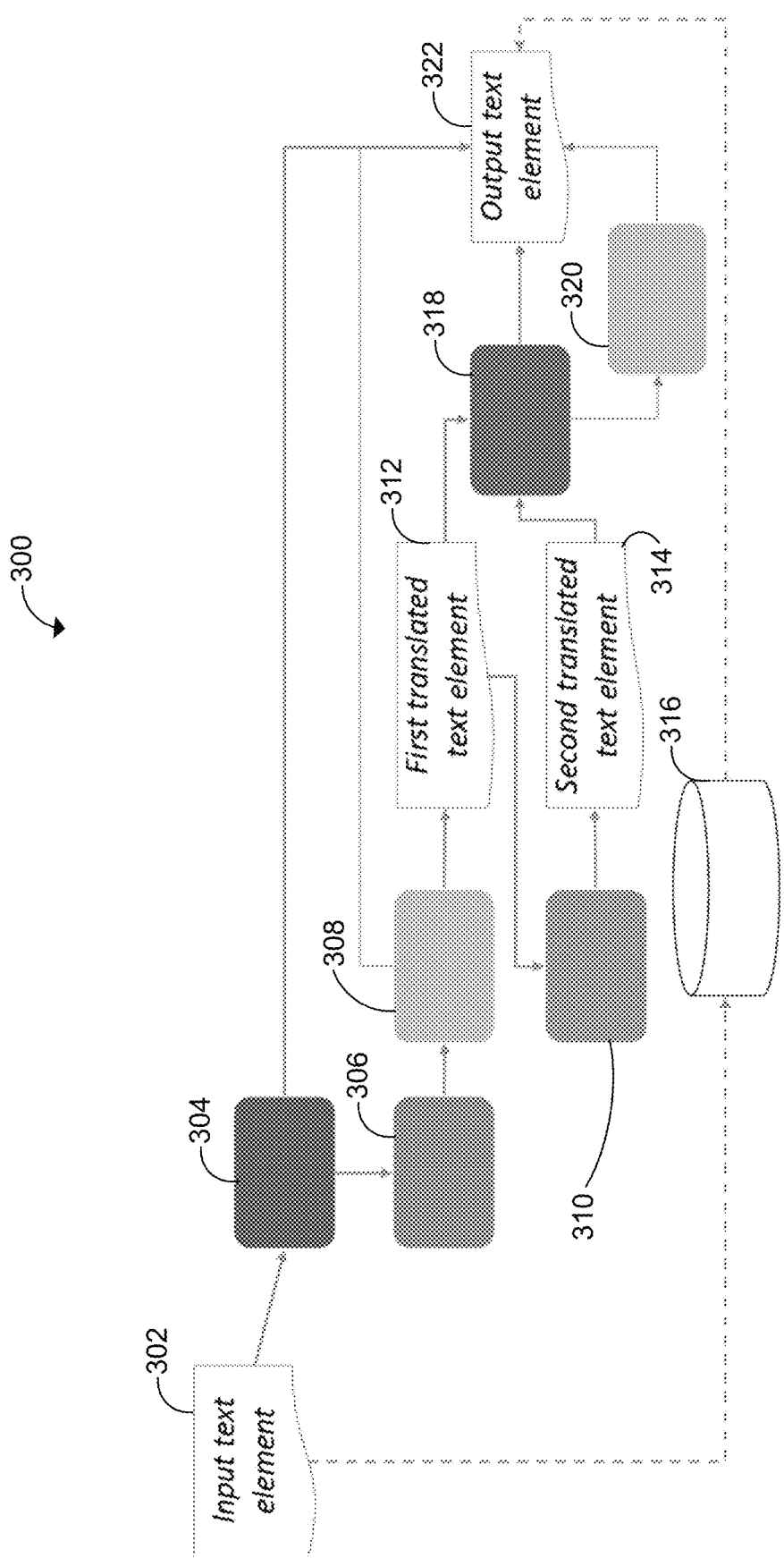
FIG. 3 is a software component diagram of the language translation system.

Referring to FIG. 3, there is shown a data architecture diagram 300 of the translation server of the language translation system. An input text element 302 (also referred to herein as a source text element) is received at a rule-based translation module 304. The input text element 302 is in a first language. The input text element 302 may be as large as a paragraph, or may be as small as one word. In the preferred embodiment, each text element may be a phrase or a sentence.

The input text element 302 may be represented in an alphabet form, such as Latin script, a Cyrillic script, or Greek script. The input text element may be represented in a logographic form, such as Chinese characters, Japanese kanji, etc. The input text element 302 may be encoded in a variety of different character encodings, such as Unicode, UTF-8, ISO 8859, etc.

The input text element 302 may be in a variety of different input languages, for example, Chinese, Spanish, English, Hindi, Bengali, Portuguese, Russian, Japanese, etc. The input text element may further be associated with input metadata. The input metadata may include information relating to the original document of the input text element, information related to the author of the document, information relating to the subject matter of the document (for example, a text element from a finance type document, or a shareholder agreement may have metadata associated particularly with those types of documents). The input metadata for input text element 302 may be the same as the text element metadata in the document corpus (see above).

The input text element 302 may be received at a rule-based machine translation module 304. The rule-based machine translation module 304 has a ruleset that may determine the output text element 322 if the input text element 302 matches a rule in the ruleset. One or more rules in the ruleset may have a regular expression that may match the input text element, and may provide a corresponding text element translation that is used at the output text element 322.

An input text element 302 that does not match a rule in the rule-based machine translation module 304 may be sent to the machine translation selector module 306.

The machine translation selector module 306 may determine a selected machine translation model in the plurality of machine translation models 308. The selection may be made based on a machine translation model, such as a classifier-based machine learning model.

The classification and selection of the machine translation model may be made based upon the input text element, and additionally may be made based upon input metadata associated with the input text element. The classification and selection may be made based upon a determination of whether the input text element is in-domain for a particular machine translator in the plurality of machine translators 308. An in-domain determination may mean that the input text element is determined to be of a particular subject matter type (e.g. finance, clothing, shoes, etc.), of a particular input language (e.g. French, English, Chinese), etc.

The selected translation model in the plurality of machine translation models 308 may be a statistical machine translation model, a neural machine translation model, or a $3^{rd}$ party machine translation model. The selected translation model translates the input text element and generates a first translated text element 312. The first translated text element 312 may be sent to the post-editing module 310 and the quality evaluation module 318.

The post-editor module 310 generates a predicted post-edit to the first translated text element 312 to produce the second translated text element 314. The post-editor module 310 may have a post-editing model that may comprise a neural network. The predicted post-edit in the second translated text element may involve deleting characters, deleting words, adding characters, adding words, transposing characters, transposing words, removing accents or other diacritical characters, adding accents or diacritical characters, etc.

The post-editor module 310 generates the post-edited second translated text element 314, and sends it to the quality evaluation module 318.

The quality evaluation module 318 receives the first translated text element 312 and the second translated text element 314. The quality evaluation module 318 generates a first quality metric for the first translated text element and a second quality metric for the second translated text element. The quality evaluation module 318 may have a quality evaluation model for predicting a quality metric for a text element.

The first and second quality metrics may be compared to each other at the quality evaluation module, and the output text element may be selected based on the first text element or the second text element with the highest quality metric.

The first and second quality metrics may be compared to a threshold, and if both metrics are below the threshold, then the input text element 302 may be sent to a $3^{rd}$ party machine translation model 320 and the output text element 322 may be selected from the output of the $3^{rd}$ party translation model 320.

The first quality metric may be sent to the selected machine translation model in the plurality of machine translation models. The second quality metric may be sent to the post-editing module. The first and second quality metrics may be stored in a database (e.g. database 110 in FIG. 1) in association with the input text element 302, the first translated text element 312, and the second translated text element 314.

The output text element 322 may be stored in a cache 316. The cache entry for output text element 322 may have a cache key corresponding to the input text element. The cache entry for the output text element 322 may have a cache key corresponding to a hash of the input text element.

Figure 4:
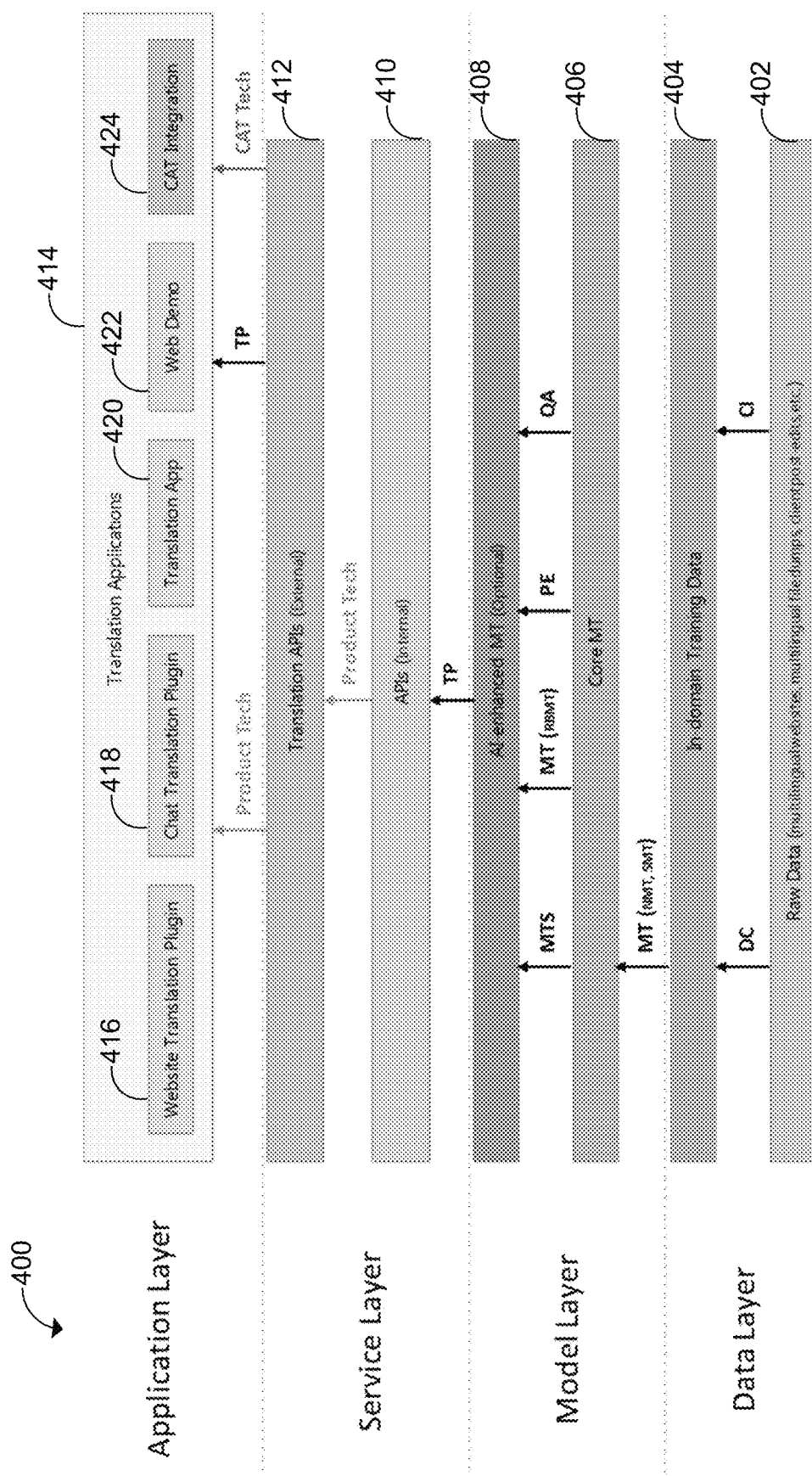
FIG. 4 is a data architecture diagram of the language translation system.

Referring to FIG. 4, there is an architecture diagram 400 of the machine translation system. The architecture of the machine translation system includes a raw data layer 402, an in-domain training data layer 404, a core machine translation layer 406, a machine learning enhanced machine translation layer 408, a plurality of APIs layer 410, a plurality of translation APIs layer 412, and an application layer 414.

The application layer 414 includes a translation plugin 416, a chat translation plugin 418, a translation app 420, a web demo 422, and a CAT integration 424.

Raw data layer 402 may be a plurality of multilingual websites, multilingual file dumps, and a plurality of multilingual client data. For example, the raw data layer 402 may include the United Nations (UN) document corpus in a plurality of languages, or the Wikipedia® document corpus. The raw data layer 402 is ingested by the language translation system, and may be stored in a database (for example, database 110 in FIG. 1). The system may determine a corpus context for each corpus that is ingested by the language translation system. The system may determine a document context for each document in each corpus that is ingested by the language translation system. This may, for example, identify particular document domains including subject matter and language.

In-domain training data layer 404, i.e. the data ingested from raw data layer 402 is used to determine a plurality of machine translation models. This may be done at a training server. The in-domain training data layer 404 may be used for training a statistical machine translation model, or a neural machine translation model. The plurality of machine translation models is provided to the core machine translation layer 406 so that language translations may be performed by the language translation system.

The core machine translation layer 406 may provide for machine translation selection, rules-based machine translation, post-editing, and quality evaluation.

The machine learning enhanced machine translation layer 408 may use the plurality of machine translation models in addition to the machine selection, post-editing, and quality evaluation functionality for machine translation. The machine translation service is provided to the internal API layer 410 by the machine learning enhanced machine translation layer 408.

The translation service is provided in the internal API layer 410 by a translation provider. The translation provider may provide a Representation State Transfer (REST) API.

Such an API may respond to HTTP requests over the network, including a translation request to the internal API. The internal API layer 410 may enable requests and responses in a variety of formats, including eXtensible Markup Language (XML) or JavaScript Object Notation (JSON). The internal API layer 410 may be a $1^{st}$ party API.

The internal API layer 410 may have $1^{st}$ party software applications to provide business functionality (such as the provision of business forms) to operate aspects of the translation system. This may include the machine translation selector, language translation, post-editing, and quality evaluation. The first-party software may provide an external translation API layer 412.

The external translation API layer 412 may be provided externally to clients. The external API may be a REST API. Such an API may respond to HTTP requests over the network, including a translation request to the external API. The external API layer 412 may enable requests and responses in a variety of formats, including XML or JSON.

Client applications are shown in application layer 414. Clients of machine translation systems may develop software applications that integrate with the language translation system. Examples of client applications include a website translation plugin 416, a chat translation plugin 418, a translation app 420, a web demo 422, and a CAT integration 424.

Figure 5:
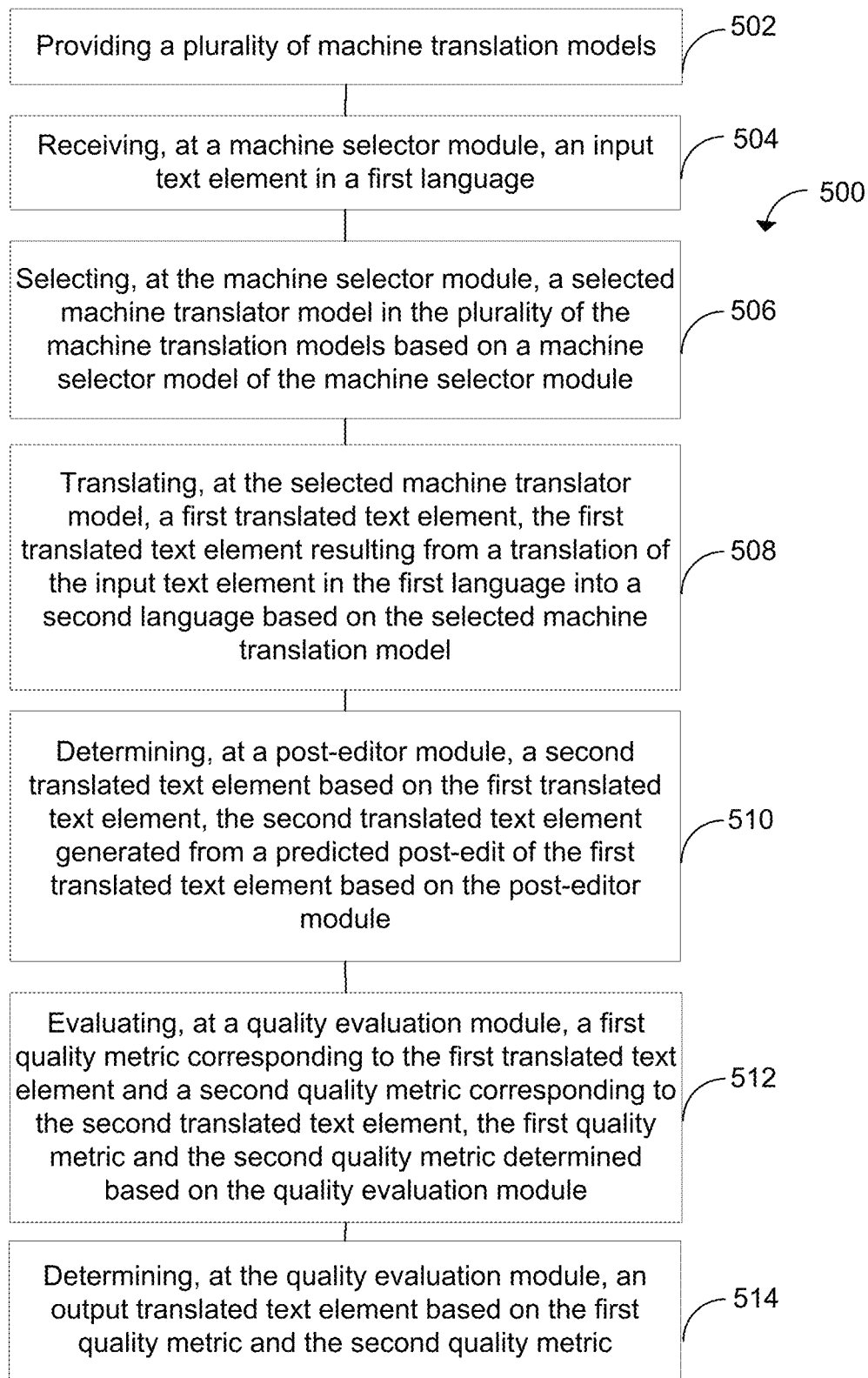
FIG. 5 is a flowchart of an example method of language translation.

Referring to FIG. 5, there is a method diagram 500 for language translation at a translation server.

At act 502, a plurality of machine translation models are provided. The plurality of machine translation models may include, as described above, statistical, neural, and $3^{rd}$ party machine translation models. The plurality of machine translation models may be received from a $3^{rd}$ party, or may be generated by the training server. The plurality of machine translation models may be provided from a database.

At act 504, an input text element in a first language is received at a machine selector module. Optionally, before the input text element may be received at a rule-based translation module.

At act 506, a selected machine translator model in the plurality of the machine translation models is selected at the machine selector module, based on a machine selector model of the machine selector module. The machine selector module may have a machine selector model for selecting the machine translator model. The machine selector model may be a machine learning classifier that may classify the input text element as in-domain for the selected machine translated model in the plurality of machine translation models.

At act 508, a first translated text element is translated at the selected machine translator model, the first translated text element resulting from a translation of the input text element in the first language into a second language based on the selected machine translation model.

At act 510, a second translated text element is determined at a post-editor module, based on the first translated text element, the second translated text element generated from a predicted post-edit of the first translated text element based on the post-editor module. The post-editor module may have a post editor machine learning model for determining the second translated sentence.

At act 512, a first quality metric corresponding to the first translated text element and a second quality metric corresponding to the second translated text element are evaluated at a quality evaluation module, the first quality metric and the second quality metric determined based on the quality evaluation module. The quality evaluation module may have a post editor model for determining the first quality metric and the second quality metric.

At act 514, a output translated text element based on the first quality metric and the second quality metric is determined at the quality evaluation module.

Figure 6:
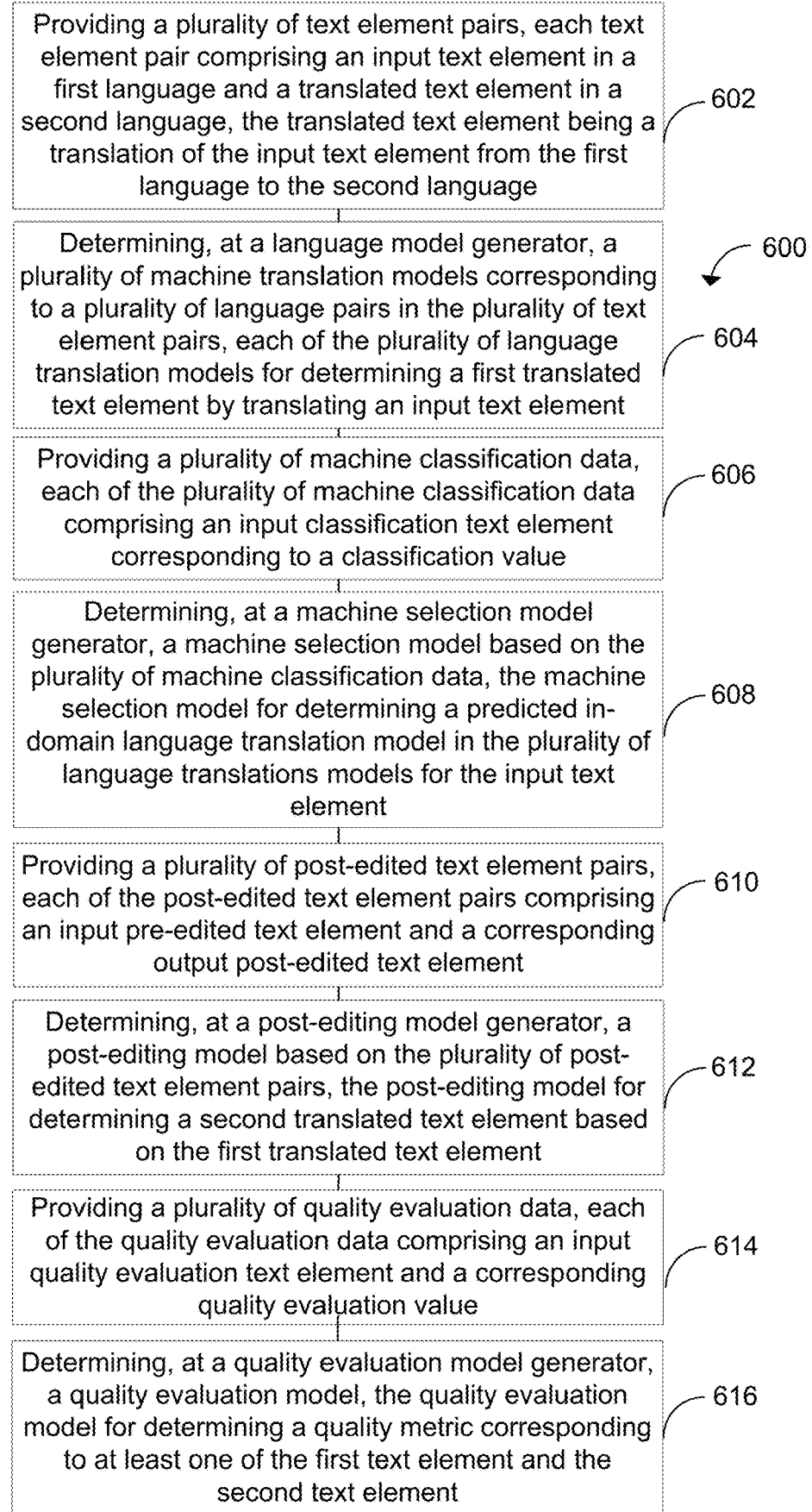
FIG. 6 is a flowchart of an example method of model training for language translation.

Referring to FIG. 6, there is shown a method diagram 600 for training a plurality of language translation models.

At act 602, a plurality of text element pairs are provided, each text element pair comprising an input text element in a first language and a translated text element in a second language, the translated text element being a translation of the input text element from the first language to the second language.

At act 604, a plurality of machine translation models corresponding to a plurality of language pairs in the plurality of text element pairs are determined at a language model generator, each of the plurality of language translation models for determining a first translated text element by translating an input text element.

At act 606, a plurality of machine classification data are provided, each of the plurality of machine classification data comprising an input classification text element corresponding to a classification value.

At act 608, a machine selection model is determined at a machine selection model generator, based on the plurality of machine classification data, the machine selection model for determining a predicted in-domain language translation model in the plurality of language translations models for the input text element.

At act 610, a plurality of post-edited text element pairs are provided, each of the post-edited text element pairs comprising an input pre-edited text element and a corresponding output post-edited text element.

At act 612, a post-editing model is determined at a post-editing model generator, based on the plurality of post-edited text element pairs, the post-editing model for determining a second translated text element based on the first translated text element.

At act 614, a plurality of quality evaluation data is provided, each of the quality evaluation data comprising an input quality evaluation text element and a corresponding quality evaluation value.

At act 616, a quality evaluation model is determined at a quality evaluation model generator, the quality evaluation model for determining a quality metric corresponding to at least one of the first text element and the second text element.

Referring to FIG. 7A, there is shown an example of a machine selector diagram 700. The machine selector module 702 has three connected machine translation models, a neural machine translator A 704, a statistical machine translator A 706, and a $3^{rd}$ party translator A 708. As discussed herein, the machine selector module 702 may have a machine translation model such as a classifier to identify a selected machine translation model in the plurality of machine translation models to translate an input text element. The selection of the machine translation model may be based on the text data of the text element, but may also include metadata associated with the text element. The selection of the machine translation model may be stored in a database, including the input text element and associated metadata. Upon selection of the machine translation model in the plurality of machine translation models, the input text element is sent to the selected translation model for translation.

The machine selector module 702 is shown having only three models, however it is understood that there may be many models in the plurality of machine translation models for the machine selector to select from. Furthermore, it is understood that there may be a variable composition of neural, statistical, and $3^{rd}$ party translation models in the plurality of machine translation models. There may be other types of machine translation models in the plurality of machine translation models.

A single neural machine translator A 704 is shown, but it is understood that there may be many neural machine translators including neural machine translator A 704 in the plurality of machine translation models.

A single statistical machine translator A 706 is shown, but it is understood that there may be many statistical machine translators including statistical machine translator A 706 in the plurality of machine translation models.

A single $3^{rd}$ party translator A 708 is shown, but it is understood that there may be many $3^{rd}$ party translators including $3^{rd}$ party translator 708 in the plurality of machine translation models.

Referring to FIG. 7B, there is a training data table 720 related to machine translation selection. The training data table may be stored in a database. The training data table may be referred to herein as a classification document corpus. Each row in the training data table may represent historical classification data submitted for translation, and may include an input text element, one or more input text metadata, and a classification label. While only 9 rows are shown, it is understood that the training data table 720 may have a large number of rows, including thousands or millions of rows.

The input text element of each row corresponds to historical text element input, and may include a classification that has been automatically labelled or labelled by a human.

While only a single input text metadata column is shown, there may be multiple metadata references for each row. The input text metadata may be an identifier to another database table.

The classification document corpus may include metadata associated with the input text element. The metadata may include a user identifier associated with a user who submitted the input text element, one or more timestamps associated with the input text element (such as a created time, a modified time, etc.), the language of an input text element, etc. The text-element metadata in the classification corpus may include a document identifier associated with a parent document, a paragraph identifier associated with a parent paragraph, and a phrase identifier. The text element metadata may include an associated client identifier, and a source identifier associated with the particular client application sourcing the text element. The text element metadata may include a text encoding such as UTF-8, and a text element size (in both number of characters and the size).

The metadata may be associated with the creation of the classification label itself, for example, the metadata may reference a user who performed the classification, the time the classification was made, a model identifier used to generate a classification for the input text element, etc. The classification label is associated with a machine translation model for translating the input text element. The metadata associated with the classification label may also include one or more timestamps associated with the classification label (such as a created time, a modified time, etc.).

The training data table 720 may be used by machine classification training method (see FIG. 7D) for generating a machine classification model.

Referring to FIG. 7C, there is shown a flowchart of an example method of machine translation selection 740 that is performed by a machine translation module. While one particular example of selecting a machine language model is shown, there may be many different implementations used to select a model for language translation.

At act 742 a plurality of machine translation models and a machine selection model comprising a plurality of weights is provided.

At act 744, an input text element in a first language is received at a machine selector module.

At act 746, a plurality of word vectors corresponding to each word in the input text element are generated. The plurality of word vectors may further include metadata elements associated with the input text-element. Each word vector may further include metadata elements associated with the input text-element.

At act 748, a plurality of paragraph vectors corresponding to the plurality of word vectors in each paragraph in the corresponding input text element are generated. The plurality of paragraph vectors may further include metadata elements associated with the input text-element. Each paragraph vector may further include metadata elements associated with the input text-element.

At act 750, a gradient descent is performed on the plurality of paragraph vectors.

At act 752, the input text element is classified based on the gradient descent, using a logistic regression.

At act 754, a selected machine translator model in the plurality of the machine translation models is selected at the machine selector module, based on the logistic regression.

Referring to FIG. 7D, there is shown a flowchart of an example method of training a machine translation selection model 760.

At act 762, a plurality of machine classification data is provided, each of the plurality of machine classification data comprising an input classification text element corresponding to a classification value. The plurality of machine classification data may be in a classification document corpus.

At act 764, for each machine classification datum in the machine classification corpus, performing acts 766 and 768.

At act 766, a plurality of word vectors corresponding to each word in the corresponding input classification text element is generated. The plurality of word vectors may further include metadata elements associated with the input text-element in the classification document corpus. Each word vector may further include metadata elements associated with the input text-element in the classification document corpus.

At act 768, a plurality of paragraph vectors corresponding to the plurality of word vectors in each paragraph in the corresponding input classification text element is generated. The plurality of paragraph vectors may further include metadata elements associated with the input text-element. Each paragraph vector may further include metadata elements associated with the input text-element in the classification document corpus.

At act 770, a plurality of weights is generated corresponding to machine classification datum by performing a gradient descent of the plurality of paragraph vectors.

At act 772, a machine selection model comprising the plurality of weights is determined at a machine selection model generator, the machine selection model for determining a predicted in-domain language translation model in the plurality of language translations models for an input text element.

Referring to FIG. 8A, there is shown an example of a user interface 800 for post-editing. The post-editing user interface 800 shows user device 808 having a display 812 that shows the user interface. The display 812 shows a source (also referred to herein as 'input') text element field 810, a pre-edited translation field 802, a post-edited translation field 804, and a submit button 806.

The user interface 800 may be a software application in the application layer (see FIG. 4). The user interface 800 provides a user with the ability to manually post-edit a translated text element for corrections to the translation. The post-edited text element provided by the user may be stored in a database in association with the input text element and the translated text element upon submission using submit button 806, and may form the post-editing document corpus in FIG. 8B.

The user interface 800 may highlight or underline the post-edits made by a user, as shown in the post-edited translation field 804.

Referring to FIG. 8B, there is shown a training data table 820 illustrating exemplary data related to post-editing. The training data table 820 may be referred to herein as a post-editing document corpus. The training data table may be stored in a database. Each row in the training data table may represent historical post-editing data, and may include an input source text element (also referred to herein as an input text element or a source text element), an input target text element, one or more input text metadata, an output text element, and one or more output text element metadata. While only 9 rows are shown, it is understood that the training data table 820 may have a large number of rows, including thousands or millions of rows.

The input source text element of each row corresponds to historical text element input that is submitted for translation. The input target text element corresponds to a first translated text element provided by a selected machine translation model. The output target text element corresponds to a second translated text element that is post-edited after translation.

While only a single input text metadata column is shown, there may be multiple metadata references for each row. The input text metadata may be an identifier to another database table.

While only a single output text metadata column is shown, there may be multiple metadata references for each row. The output text metadata may be an identifier to another database table.

The post-editing document corpus may include metadata associated with the input source text element and the output text element. The metadata may include a user identifier associated with a user who submitted the input text element, one or more timestamps associated with the input text element (such as a created time, a modified time, etc.), the language of an input text element, etc. The text-element metadata in the post-editing corpus may include a document identifier associated with a parent document, a paragraph identifier associated with a parent paragraph, and a phrase identifier. The text element metadata may include an associated client identifier, a source identifier associated with the particular client application sourcing the text element. The text element metadata may include a text encoding such as UTF-8, and a text element size (in both number of characters and the size).

The metadata may be associated with the creation of the output target text element itself, for example, the metadata may reference a user who performed the post-editing, the time the post-editing was made, a model identifier used to post-edit the output text element for the input text element, etc. The output target text element may be associated with a machine translation model used to translate the input target text element. The metadata associated with the output target text element may also include one or more timestamps associated with the output target text element (such as a created time, a modified time, etc.).

The training data table 820 may be used by post-editing training method (see FIG. 8D) for generating a post-editing model.

Referring to FIG. 8C, there is shown a flowchart of an example method 840 of predicting a post-edit. The predicted post-edit may be used to determine a second translated text element based on a first translated text element. The predicted post-edit method may be implemented in a post-edit module. The post-edit module may have a post-editing model, such as a deep learning model. The deep learning model may include a deep neural network, a deep belief network, a Transformer neural network, a recurrent neural network, and a convolutional neural network.

At act 842, an input text element and a first translated text element are received by the post-editing module. The input text element may be received from an API layer, or from a machine selection module. The first translated text element may be received from the selected machine translator in the plurality of machine translation models.

At act 844, a vector representation of the input text element and a vector representation of the first translated text element are determined at the post-editing module. These vector representations may be determined by tokenizing the text elements, normalizing the token representation, and then determining a vector value associated with the text element. The vector value may be determined based on a bag of words, Term Frequency/Inverse Document Frequency (TFIDF) or Word2vec algorithms. The vector representations may further be byte-pair encoded.

At act 846, a context vector of the input text element is determined by encoding the vector representation of the input text element using a first encoder in the post-editing model.

At act 848, a context vector of the first translated text element is determined by encoding the vector representation of the first translated text element using a second encoder in the post-editing model.

At act 850, the context vector of the input text element and the context vector of the first translated text element are combined. The combined context vector may be used by a decoder in the post-editing model to initially determine a plurality of hidden states. The combination may involve concatenation of the two context vectors.

At act 852, a second translated text element is generated by decoding the combined context vector using a decoder in the post-editing model. The generation of the second translated text element may be performed one word at a time. The decoder may implement an attention layer to be used when the combined context vector is decoded. The second translated text element may be post-processed after being decoded to provide a human readable form. The second translated text element may be stored in a database including references to the first translated text element and the input text element. The second translated text element may further be stored in a cache.

Referring to FIG. 8D, there is shown a flowchart of an example method of training a post-editing model 860. The method 860 may be performed by the post-editing model generator. The method 860 may be used to generate a post-editing model for providing automated post-editing of translated text elements.

At act 862, a plurality of post-edited text element triplets are provided, each of the post-edited text element triplets comprising an input sentence, a first translated text element and a corresponding second translated text element.

At act 864, a vector representation of each post-edited text element triplet is determined, comprising a vector representation of the input sentence, a vector representation of the first translated text element, and a vector representation of the second text element. These vector representations may be determined by tokenizing the text elements, normalizing the token representation, and then determining a vector value associated with the text element. The vector value may be determined based on a bag of words, Term Frequency/Inverse Document Frequency (TFIDF) or Word2vec algorithms. The vector representations may further be byte-pair encoded.

At act 866, a first plurality of weights of a first encoder model in the post-editing model are determined by gradient descent of the plurality of post-edited text element triplets.

At act 868, a first plurality of gradients of a first encoder model in the post-editing model are determined by back propagation.

At act 870, a second plurality of weights of a second encoder model in the post-editing model is determined by gradient descent of the plurality of post-edited text element triplets.

At act 872, a second plurality of gradients of a second encoder model in the post-editing model is determined by back propagation.

The method may further include determining a third plurality of weights of a first decoder model in the post-editing model and determining a third plurality of gradients in a first decoder model in the post-editing model.

Acts 866-872 (and optionally the determination of the decoder model) may be performed repeatedly until a predetermined count of executions is reached, or alternatively, until a quality score determined from the translation of a validation dataset reaches a predetermined prediction accuracy value or percentage.

Referring to FIG. 9A, there is shown an example of a user interface for quality evaluation 900. The quality evaluation user interface 900 shows user device 902 having a display 914 that shows the user interface. The display 914 shows a source (also referred to herein as 'input') text element field 912, a translation field 904, a quality score 906, optionally a slider 908, and a submit button 910.

The user interface 900 may be a software application in the application layer (see FIG. 4). The user interface 900 provides a user with the ability to manually provide a quality evaluation based on the translation of a text element when compared to the source text element.

The quality score may be provided by the user using a slider, or by direct entry of a number. Instead of a number, a plurality of categories may be displayed and the user may select from them. For example, the categories may be letter grades, including 'A', 'B', 'C', and 'D'. The user submitted quality score may be stored in a database in association with the input text element and the translated text element upon submission using submit button 910, and may form the quality evaluation document corpus in FIG. 9B.

The user interface 900 may highlight or underline the post-edits made by a user, as shown in the translation field 904.

Referring to FIG. 9B, there is shown a training data table 920 illustrating exemplary data related to quality evaluation. The training data table 920 may be referred to herein as a quality evaluation document corpus. The training data table may be stored in a database. Each row in the training data table may represent historical quality evaluation data, and may include an input source text element (also referred to herein as an input text element or a source text element), one or more input text metadata (not shown), a translated text element, one or more translated text metadata, and an evaluation score. While only 18 rows are shown, it is understood that the training data table 920 may have a large number of rows, including thousands or millions of rows.

The input source text element of each row corresponds to historical text element input that is submitted for translation. The translated text element corresponds to a first translated text element provided by a selected machine translation model or a second translated text element provided by a post-editing module. The evaluation score corresponds to a quality metric associated with the translated text element. The evaluation score may be human generated, but may also be automatically generated using a quality evaluation module.

There may be multiple metadata references in the input text metadata for each row. The input text metadata may be an identifier to another database table.

While only a single translated text metadata column is shown, there may be multiple metadata references for each row. The translated text metadata may be an identifier to another database table.

The quality evaluation document corpus may include metadata associated with the input source text element and the translated text element. The metadata may include a user identifier associated with a user who submitted the input text element, one or more timestamps associated with the input text element (such as a created time, a modified time, etc.), the language of an input text element, etc. The text-element metadata in the quality evaluation corpus may include a document identifier associated with a parent document, a paragraph identifier associated with a parent paragraph, and a phrase identifier. The text element metadata may include an associated client identifier, a source identifier associated with the particular client application sourcing the text element. The text element metadata may include a text encoding such as UTF-8, a text element size (in both number of characters and the size).

The metadata may be associated with the creation of the translated text element itself, for example, the metadata may reference a user who performed the quality evaluation, the time the quality evaluation was made, a model identifier used to evaluate the quality of the output text element for the input text element, etc. The output target text element may be associated with a machine translation model used to translate the input target text element. The metadata associated with the output target text element may also include one or more timestamps associated with the output target text element (such as a created time, a modified time, etc.).

The training data table 920 may be used by quality evaluation training method (see FIG. 9D) for generating a quality evaluation model.

Referring to FIG. 9C is shown a flowchart of an example method of quality evaluation 940. The method 940 may be performed by a quality evaluation module. The quality evaluation module may have a quality evaluation model for predicting a quality metric. Optionally, the quality evaluation model may be pre-loaded into memory of the translation server. Optionally, the model may be a BLEU prediction model. Optionally, the model may be a classifier that can assign a quality category to a translated text element, such as 'A', 'B', 'C', 'D' or 'Good', 'Mediocre', or 'Bad'. The quality evaluation method 940 may determine a quality metric associated with a translated text element. The quality metric and associated input text element, translated text element, and quality metric may be stored in a database. The generated quality metrics may be sent to the post-editing module, the selected machine translation model in the plurality of machine translation models, and the machine selection module.

At act 942, an input text element and a translated text element are received at a quality evaluation module. The input text element may be received from an API layer or the machine selection module. The translated text element may be received from a selected machine translation model or from the post-editing module, or from both.

At act 944, a vector representation of the input text element and a vector representation of the translated text element are determined. These vector representations may be determined by tokenizing the text elements, normalizing the token representation, and then determining a vector value associated with the text element. The vector value may be determined based on a bag of words, Term Frequency/Inverse Document Frequency (TFIDF) or Word2vec algorithms. The vector representations may further be byte-pair encoded.

At act 946, based on the vector representation of the input text element and the vector representation of the translated text element, a feature matrix is determined. In the feature matrix, each row may represent the features extracted from each input text element/translation text element pair, and each cell of a row is a feature.

At act 948, based on the feature matrix, a predicted quality metric associated with the translated text element is determined. The determination of the quality metric may involve using a regression model that accepts as input the feature matrix including extracted features, then predicts a quality metric as output. In the case that the quality evaluation model is a classifier, then the model may predict the "goodness" as a categorical output, where the "goodness" indicates whether the translation is a good translation or bad translation based on a category value such as 'A', 'B', 'C', or 'D', or 'Good', 'Mediocre', or 'Bad'. The predicted quality metric may be a BLEU metric.

Referring to FIG. 9D, there is shown a flowchart of an example method of training a quality evaluation model 960. The method 960 may be performed by the quality evaluation model generator. The method 960 may be used to generate a quality evaluation model for providing automated quality evaluation of translated text elements.

At act 962, a plurality of quality evaluation text element tuples is provided, each of the quality evaluation text element tuples comprising an input text element, a reference text element, a translated text element, and a labelled translation value.

At act 964, a vector representation of each quality evaluation text element tuples is determined, comprising a vector representation of the input text element, a vector representation of the reference text element, and a vector representation of the translated text element. These vector representations may be determined by tokenizing the text elements, normalizing the token representation, and then determining a vector value associated with the text element. The vector value may be determined based on a bag of words, Term Frequency/Inverse Document Frequency (TFIDF) or Word2vec algorithms. The vector representations may further be byte-pair encoded.

At act 966, a feature matrix based on the vector representation of each quality evaluation text element tuple is determined.

At act 968, a regression model is determined based on the feature matrix. This may be performed using a XGboost Regressor.

At act 970, a classification model is determined based on the feature matrix. This may be performed using a XGboost Classifier.

Acts 968-970 may be performed repeatedly until a predetermined count of executions is reached, or alternatively, until a quality score determined from the translation of a validation dataset reaches a predetermined prediction accuracy value or percentage.

We claim:

1. A computer implemented method for language translation, the method comprising:
providing a plurality of domain specific machine translation models;
receiving, at a machine selector module, an input text element in a first language;
selecting, at the machine selector module, a selected domain specific machine translator model in the plurality of the domain specific machine translation models by applying a machine selector model of the machine selector module, the machine selector model for selecting the selected domain specific machine translator model by classifying the input text element as in-domain for the selected domain specific translator model, the selected domain specific machine translator model corresponding to a domain of the input text element in the first language;
translating, at the selected domain specific machine translator model, a first translated text element, the first translated text element resulting from a translation of the input text element in the first language into a second language based on the selected domain specific machine translation model;
determining, at a post-editor module, a second translated text element based on the first translated text element, the second translated text element generated from a predicted post-edit of the first translated text element based on the post-editor module;
evaluating, at a quality evaluation module, a first quality metric corresponding to the first translated text element and a second quality metric corresponding to the second translated text element, the first quality metric and the second quality metric determined based on the quality evaluation module; and
determining, at the quality evaluation module, an output translated text element based on the first quality metric and the second quality metric.

2. The method of claim 1, wherein the post-editor module comprises a post-editing model, the post-editing model for generating the second translated text element by predicting the predicted post-edit.

3. The method of claim 2, wherein the quality evaluation module comprises a quality evaluation model, the quality evaluation model for determining the first quality metric and the second quality metric.

4. The method of claim 3 wherein each of the plurality of domain specific machine translation models comprises at least one of a statistical language translation model, a neural network language translation model, and a third party language translation model.

5. The method of claim 4 wherein if the input text element is in-domain of the third party language translation model, the first translated text element is used as the output translated text element.

6. The method of claim 5 further comprising:
determining, at a rule-based translator comprising a plurality of translation rules, if the input text element matches a candidate translation rule in the plurality of translation rules, and if so:
  determining the output translated text element based on the input text element and the candidate translation rule.

7. The method of claim 6 wherein each of the plurality of translation rules comprises a regular expression.

8. The method of claim 7 further comprising:
determining, at a cache in a memory, the presence of the input text element in the cache using the input text element as a cache key, and
if the input text element is present in the cache:
  determining the output translated text element based on a cache value associated with the cache key;
otherwise:
  storing the output translated text element in the cache using the input text element as the cache key.

9. The method of claim 8, further comprising:
outputting the output translated text element.

10. The method of claim 9 further comprising:
if the first and second quality metrics are less than a threshold:
  determining the output translated text element based on the third-party language translation model.

11. The method of claim 10, wherein the first quality metric, the first text element, the second quality metric, and the second text element are provided to the post-editor.

12. A system for language translation, the system comprising:
a memory, the memory comprising:
  a plurality of domain specific machine translation models;
  a machine selector module;
  a post-editing module;
  a quality evaluation module;
a processor in communication with the memory, the processor configured to:
  receive an input text element in a first language;
  select, using the machine selector module, a selected domain specific machine translator model in the plurality of domain specific machine translation models by applying a machine selector model of the machine selector module, the machine selector model for selecting the selected domain specific machine translator model by classifying the input text element as in-domain for the selected domain specific machine translator model, the selected domain specific machine translator model corresponding to a domain of the input text element in the first language;
  translate, using the selected domain specific machine translator model, a first translated text element, the first translated text element resulting from a translation of the input text element in the first language into a second language based on the selected domain specific machine translation model;
  determine, using the post-editor module, a second translated text element based on the first translated text element, the second translated text element resulting from a predicted post-edit of the first translated text element;
  evaluate, using the quality evaluation module, a first quality metric corresponding to the first translated text element and a second quality metric corresponding to the second translated text element; and
  determine, at the quality evaluation module, the output translated text element based on the first quality metric and the second quality metric.

13. The system of claim 12, wherein the post-editor module comprises a post-editing model, the post-editing model for generating the second translated text element by predicting the predicted post-edit.

14. The system of claim 13, wherein the quality evaluation module comprises a quality evaluation model, the quality evaluation model for determining the first quality metric and the second quality metric.

15. The system of claim 14, wherein the plurality of domain specific machine translation models comprises at least one of a statistical language translation model, a neural network language translation model, and a third party language translation model.

16. The system of claim 15, wherein if the input text element is in-domain of the third party language translation model, the first translated text element is used as the output translated text element.

17. The system of claim 16, further comprising:
the memory further comprising:
  a rule-based translator comprising a plurality of translation rules;
the processor further configured to:
  determine, at the rule-based translator, if the input text element matches a candidate translation rule in the plurality of translation rules, and if so:
    determine the output translated text element based on the input text element and the candidate translation rule.

18. The system of claim 17 wherein each of the plurality of translation rules comprises a regular expression.

19. The system of claim 18 further comprising:
the memory further comprising:
  a cache;
the processor further configured to:
  determine, at the cache, the presence of the input text element in the cache using the input text element as a cache key, and
  if the input text element is present in the cache:
    determine the output translated text element based on a cache value associated with the cache key;
  otherwise:
    store the output translated text element in the cache using the input text element as the cache key.

20. The system of claim 19 wherein the processor is further configured to:
output the output translated text element to a display device.

21. The system of claim 20 wherein the processor is further configured to:
if the first and second quality metrics are less than a threshold:
  determine the output translated text element based on the third-party language translation model.

22. The system of claim 21, wherein the first quality metric, the first text element, the second quality metric, and the second text element are provided to the post-editor model.

23. A computer implemented method for determining a plurality of domain specific machine translation models for language translation, the method comprising:
providing a plurality of text element pairs, each text element pair comprising an input text element in a first language and a translated text element in a second language, the translated text element being a translation of the input text element from the first language to the second language;

determining, at a domain specific machine translation model generator, a plurality of domain specific machine translation models corresponding to a plurality of language pairs in the plurality of text element pairs, each of the plurality of domain specific machine translation models for determining a first translated text element by translating an input text element;

providing a plurality of machine classification data, each of the plurality of machine classification data comprising an input classification text element corresponding to a classification value;

determining, at a machine selection model generator, a machine selection model based on the plurality of machine classification data, the machine selection model for determining a predicted in-domain domain specific machine translation model in the plurality of domain specific machine translation models by classifying the input text element as in-domain for the predicted in-domain domain specific machine translation model;

providing a plurality of post-edited text element pairs, each of the post-edited text element pairs comprising an input pre-edited text element and a corresponding output post-edited text element;

determining, at a post-editing model generator, a post-editing model based on the plurality of post-edited text element pairs, the post-editing model for determining a second translated text element based on the first translated text element;

providing a plurality of quality evaluation data, each of the quality evaluation data comprising an input quality evaluation text element and a corresponding quality evaluation value; and determining, at a quality evaluation model generator, a quality evaluation model, the quality evaluation model for determining a quality metric corresponding to at least one of the first text element and the second text element.

24. The method of claim 23, wherein the plurality of domain specific machine translation models are determined using word2vec.

25. The method of claim 24, wherein the plurality of text element pairs further comprises text element metadata and document metadata.

26. The method of claim 25, wherein the plurality of machine classification data further comprises classification metadata, text element metadata, and document metadata.

27. The method of claim 26, wherein the plurality of post-edited text element pairs further comprises pre-edit metadata, post-edit metadata, text element metadata, and document metadata.

28. The method of claim 27, wherein the plurality of quality evaluation data further comprises quality evaluation metadata, text element metadata, and document metadata.

29. A system for determining a domain specific machine translation model for language translation, the system comprising:

a memory, the memory comprising:
a plurality of text element pairs, each text element pair comprising an input text element in a first language and a translated text element in a second language, the translated text element being a translation of the input text element from the first language to the second language;
a plurality of machine classification data, each of the plurality of machine classification data comprising an input classification text element corresponding to a classification value;
a plurality of post-edited text element pairs, each of the post-edited text element pairs comprising an input pre-edited text element and a corresponding output post-edited text element;
a plurality of quality evaluation data, each of the quality evaluation data comprising an input quality evaluation text element and a corresponding quality evaluation value;

a processor in communication with the memory, the processor configured to:
determine a plurality of domain specific machine translation models corresponding to a plurality of language pairs in the plurality of text element pairs, each of the plurality of domain specific machine translation models for determining a first translated text element by translating an input text element;
determine a machine selection model based on the plurality of machine classification data, the machine selection model for determining a predicted in-domain domain specific machine translation model in the plurality of domain specific machine translations models by classifying the input text element as in-domain for the predicted in-domain domain specific machine translation model;
determine a post-editing model based on the plurality of post-edited text element pairs, the post-editing model for determining a second translated text element based on the first translated text element;
determine a quality evaluation model, the quality evaluation model for determining a quality metric corresponding to at least one of the first text element and the second text element.

30. The system of claim 29, wherein the plurality of domain specific machine translation models are determined using word2vec.

31. The system of claim 30, wherein the plurality of text element pairs further comprises text element metadata and document metadata.

32. The system of claim 31, wherein the plurality of machine classification data further comprises classification metadata, text element metadata, and document metadata.

33. The system of claim 32, wherein the plurality of post-edited text element pairs further comprises post-edit metadata, text element metadata, and document metadata.

34. The system of claim 33, wherein the plurality of quality evaluation data further comprises quality evaluation metadata, text element metadata, and document metadata.

* * * * *